(12) United States Patent
Fliess et al.

(10) Patent No.: US 8,578,348 B2
(45) Date of Patent: Nov. 5, 2013

(54) SYSTEM AND METHOD OF COST ORIENTED SOFTWARE PROFILING

(75) Inventors: Alon Mordechai Fliess, Binyamina (IL); Erez Fliess, Binyamina (IL); Joshua Reuben, Ness-Ziona Valley (IL); Aaron Etchin, Hod Hasharon (IL)

(73) Assignee: Code Value Ltd., Binyamina (IL)

( * ) Notice: Subject to any disclaimer, the term of this patent is extended or adjusted under 35 U.S.C. 154(b) by 132 days.

(21) Appl. No.: 13/223,498

(22) Filed: Sep. 1, 2011

(65) Prior Publication Data

US 2012/0060142 A1 Mar. 8, 2012

Related U.S. Application Data

(60) Provisional application No. 61/379,710, filed on Sep. 2, 2010.

(51) Int. Cl.
*G06F 9/44* (2006.01)

(52) U.S. Cl.
USPC .......................... 717/135; 717/138; 717/151

(58) Field of Classification Search
USPC ................ 717/127–130, 134–136, 151–152; 706/45–46
See application file for complete search history.

(56) References Cited

U.S. PATENT DOCUMENTS

| | | | | |
|---|---|---|---|---|
| 6,044,221 A * | 3/2000 | Gupta et al. | ................... | 717/151 |
| 6,269,474 B1 * | 7/2001 | Price | ............................ | 717/104 |
| 7,152,053 B2 * | 12/2006 | Serrano-Morales et al. | ... | 706/47 |
| 7,559,049 B1 * | 7/2009 | Hemmat et al. | ............. | 717/102 |
| 7,653,563 B2 * | 1/2010 | Veeningen et al. | .......... | 705/7.28 |
| 7,669,194 B2 * | 2/2010 | Archambault et al. | ....... | 717/158 |
| 8,001,073 B2 * | 8/2011 | Painter | ............................ | 706/47 |
| 8,006,223 B2 * | 8/2011 | Boulineau et al. | ............. | 717/101 |
| 8,024,708 B2 * | 9/2011 | Demetriou et al. | ........... | 717/124 |
| 8,024,718 B2 * | 9/2011 | Miranda et al. | ............... | 717/152 |
| 8,032,875 B2 * | 10/2011 | Kosche et al. | ................. | 717/158 |
| 8,136,102 B2 * | 3/2012 | Papakipos et al. | ............. | 717/140 |
| 8,166,462 B2 * | 4/2012 | Kosche et al. | ................. | 717/130 |
| 8,255,882 B2 * | 8/2012 | Zhang et al. | ................... | 717/136 |
| 8,306,887 B1 * | 11/2012 | Bucholtz et al. | ................ | 705/35 |
| 8,375,368 B2 * | 2/2013 | Tuck et al. | ..................... | 717/130 |
| 8,429,630 B2 * | 4/2013 | Nickolov et al. | ............. | 717/148 |
| 8,447,720 B1 * | 5/2013 | Rubin | ............................. | 706/52 |

(Continued)

OTHER PUBLICATIONS

Samii et al, "A Simulation Methodology for Worst-Case Response Time Estimation of Distributed Real-Time Systems", ACM, pp. 556-561, 2008.*

(Continued)

*Primary Examiner* — Anil Khatri
(74) *Attorney, Agent, or Firm* — Woods Oviatt Gilman LLP; Howard Zaretsky

(57) ABSTRACT

A cost oriented profiler (COP) mechanism that analyzes the behavior of input application source code with regard to the software total cost of ownership (TCO). The cost analysis tool provided by the mechanism analyzes the behavior of the source code and generates a cost report with indications as to the portions of the source code that have the most impact on the TCO of the application. Based on simulations and by comparing multiple versions of the source code, the COP mechanism determines if a particular change to the source code will increase or decrease software TCO. Behavior analysis, including static and dynamic analysis of the source code, is used to generate one or more code recommendations to reduce the TCO.

62 Claims, 22 Drawing Sheets

(56) References Cited

U.S. PATENT DOCUMENTS

| | | | |
|---|---|---|---|
| 8,448,156 B2* | 5/2013 | Demetriou et al. | 717/149 |
| 8,468,112 B2* | 6/2013 | de Kleer et al. | 706/46 |
| 2005/0283765 A1 | 12/2005 | Warren et al. | |
| 2007/0016672 A1 | 1/2007 | Wilson et al. | |
| 2008/0127149 A1 | 5/2008 | Kosche et al. | |
| 2010/0198799 A1 | 8/2010 | Krishnan et al. | |

OTHER PUBLICATIONS

Sharma et al, "Applying Requirement Based Complexity for the Estimation of Software Development and Testing Effort", ACM SIGSOFT. vol. 37, No. 1, pp. 1-11, 2012.*

Lind et al, "Categorization of Real-Time Software Components for Code Size Estimation", ACM, pp. 1-10, 2010.*

Beck et al, "The Merger of Discrete Event Simulation With Activity Based Costing for Cost Estimation in Manufacturing Environments", ACM pp. 2048-2054, 2000.*

Wyld, David C., The Utility of Cloud Computing as a New Pricing- and Consumption-Model for Information Technology, Int'l Journal of Database Mgmt Sys, vol. 1, No. 1, Nov. 2009.

Li, Hong et al., Developing an Enterprise Cloud Computing Strategy, White Paper, Intel Corporation Information Technology, Jan. 2009.

Papadimitriou, G. et al., Amazon Enters the Cloud Computing Business, Stanford University School of Engineering, 2008-353-1, May 20, 2008.

Fenn, Jackie, Inside the Hype Cycle: What's Hot and What's Not in 2009, Gartner Webinar, Dec. 2, 2009.

Plummer, Daryl C. et al., Cloud Computing Confusion Leads to Opportunity, Gartner Research, ID No. G00159034, Jun. 19, 2008.

Cearley, David W., Cloud Computing Key Initiative Overview, Gartner Research, ID No. G00173626, Feb. 5, 2010.

* cited by examiner

| | LOW USAGE | MEDIUM USAGE | HIGH USAGE |
|---|---|---|---|
| ⊞ PLAN A | $ | $$ | $$$ |
| ⊞ PLAN B | $$$ | $ | $ |
| amazon PLAN A | $$$ | $$$ | $$ |
| amazon PLAN B | $ | $ | $$$ |
| Google PLAN A | $$ | $$ | $$ |
| Google PLAN B | $$$ | $$$ | $ |

SYSTEM AND METHOD OF COST ORIENTED SOFTWARE PROFILING

REFERENCE TO PRIORITY APPLICATION

This application claims priority to U.S. Provisional Application Ser. No. 61/379,710, filed Sep. 2, 2010, entitled "System And Method Of Cost Oriented Software Profiling," incorporated herein by reference in its entirety.

FIELD OF THE INVENTION

The present invention relates to the field of software profiling, and more particularly relates to a system and method of cost oriented software profiling.

BACKGROUND OF THE INVENTION

Currently, the use of cloud computing is increasing at an ever faster rate. Cloud computing is heralding an era of consumption based pricing and has the potential to transform computing to a utility like electricity and water services. The pay-as-you go model brings elasticity and cost savings as computing power is provided by the cloud provider for peak loads, e.g., during peak load periods, additional instances can be added.

Software total cost of ownership (TCO) is a well known term used to describe the financial impact of deploying an Information Technology (IT) product over its life cycle. Whether software TCO increases or decrease is largely in the hands of software developers. Although software development plays a large role in software TCO, there are several factors that affect it. Traditionally, the factors affecting TCO include software and hardware, training and maintenance. Software that is hard to use, maintain or learn is thus deemed to be costly software. Costly software products are thus likely the result of bad software architecture and poor developer skills.

Whereas up until now, architectural decisions and developer skills had only an indirect impact on software TCO, in the near future software architectures and developers will directly impact the software TCO due to the increasing use of cloud services and cloud hosting. Simply changing a single line of code can lead to either money saved or money spent. Thus, developers will need to give careful consideration to decisions regarding storage, networking and transaction behavior of software applications.

Software architecture deals with the structure of the software product. The architecture defines attributes such as scalability, maintainability, security, robustness, etc. Cost oriented architecture design emphasizes those attributes that reduce the software TCO with regard to deployment and operation in the cloud. For example, the structure of a software product can be composed of several services, some of them hosted in the cloud while others are hosted on a company server farm. The effort to minimize TCO may dictate which services are deployed in the cloud or on premise.

There is thus a need for a cost oriented profiler that is capable of analyzing application behavior in terms of cost and provide recommendations to reduce the software TCO. The profiler should provide a developer with information regarding the number of lines of code, functions and API calls that directly influence the software TCO of the application. In addition, the profiler should be able to compare two versions of the code and determine if a change to the code will either save or waste money.

SUMMARY OF THE INVENTION

The present invention is a cost oriented profiler (COP) mechanism that functions to analyze the behavior of input application source code with regard to the software total cost of ownership (TCO). The cost analysis tool provided by the mechanism is operative to analyze the behavior of the source code and generate a cost report with indications as to the portions of the source code that have the most impact on the TCO of the application.

Use of the cost oriented profiler mechanism enables organizations to reduce costs of their software TCO. A development tool such as the cost oriented profiler (COP) mechanism can provide the guidance needed in the new era of cost oriented architecture (COA) and cost oriented programming.

Several advantages of using the cost oriented profiler mechanism of the present invention include: (1) providing a correlation between application code and cost; (2) reducing the total cost of ownership; (3) ability to determine the cost of each function and relevant line of code in an application; (4) ability to determine the cost of business requests; (5) the ability to determine the cost reduction or increase as a result of code changes; (6) providing optimization advice; (7) provide guidance as to cost oriented development; (8) aid in determining the tradeoff between service quality and cost; (9) providing a framework for developing cost oriented unit tests; and (10) providing a cost oriented cloud computing standard approval.

There is thus provided in accordance with the invention, a method for use on a computer of cost oriented profiling of input software application code, the method comprising analyzing the behavior of the input application code utilizing one or more cost oriented static and dynamic analysis engines and associated static and dynamic rules, generating one or more cost reports based on the results of the behavior analysis.

There is also provided in accordance with the invention, a method for use on a computer of cost oriented profiling of input software application code, the method comprising analyzing the behavior of the input application code utilizing one or more cost oriented static and dynamic analysis engines and associated static and dynamic rules, determining one or more lines of code, blocks or functions that can potentially be optimized for cost, determining whether storage utilization costs can be optimized according to usage of the application code, and simulating the usage of the input application code using a cost oriented simulator to generate a dynamic analysis indicating any costly code found thereby providing a measure of the total cost of ownership of the application code.

There is further provided in accordance with the invention, an apparatus for cost oriented profiling of input software application code, comprising one or more cost oriented static and dynamic analysis engines, a static rules database, a dynamic rules database, a behavior analysis module operative to analyze the behavior of the input application code utilizing the one or more cost oriented static and dynamic analysis engines and the static and dynamic rules databases, and a cost oriented simulator coupled to the behavior analysis module and operative to simulate the usage of the input application code to generate a dynamic analysis indicating any costly code found by the behavior analysis module thereby providing a measure of the total cost of ownership of the input application code.

There is also provided in accordance with the invention, a computer program product for detecting unchecked signals in simulation tests of a circuit design, the computer program product comprising a non-transitory computer usable medium having computer usable code embodied therewith, the computer usable program code comprising computer usable code configured for analyzing the behavior of the input application code utilizing one or more cost oriented static and dynamic analysis engines and associated static and dynamic rules, and computer usable code configured for generating one or more cost reports based on the results of the behavior analysis.

BRIEF DESCRIPTION OF THE DRAWINGS

The invention is herein described, by way of example only, with reference to the accompanying drawings, wherein.

DETAILED DESCRIPTION OF THE INVENTION

Figure 1:
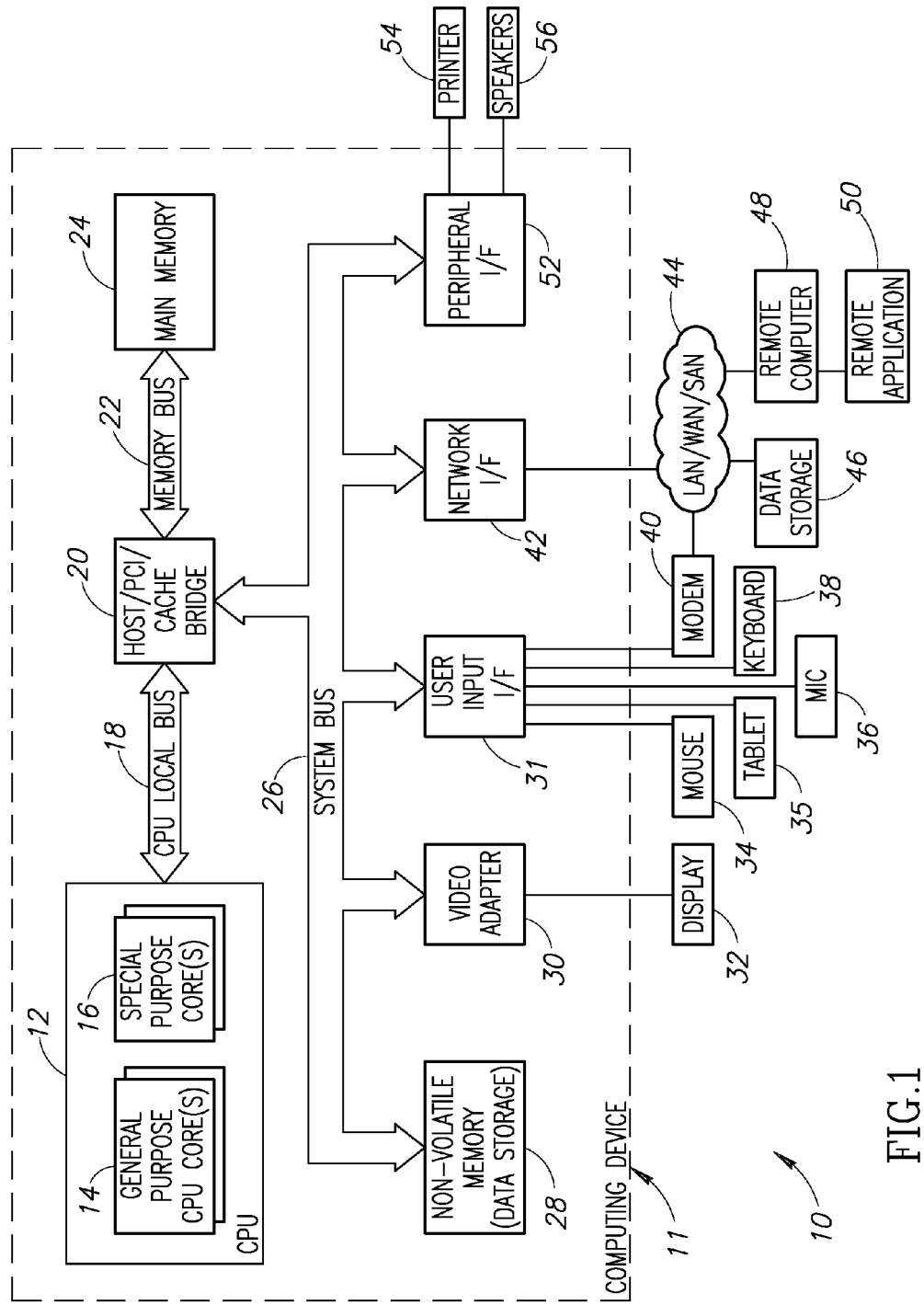
FIG. 1 is a block diagram illustrating an example computer processing system adapted to implement the cost oriented profiler mechanism of the present invention.

The present invention is a cost oriented profiler (COP) mechanism that functions to analyze the behavior of input application source code with regard to the software total cost of ownership (TCO). The cost analysis tool provided by the mechanism is operative to analyze the behavior of the source code and generate a cost report with indications as to the portions of the source code that have the most impact on the TCO of the application. Based on simulations and by comparing multiple versions of the source code, the COP mechanism determines if a particular change to the source code will increase or decrease software TCO. Behavior analysis, including static and dynamic analysis of the source code, is used to generate one or more code recommendations to reduce the TCO.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can store the program for use by or in connection with the instruction execution system, apparatus, or device.

Computer program code for carrying out operations of the present invention may be written in any combination of one or more programming languages, including an object oriented programming language such as Java™, Smalltalk™, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

A block diagram illustrating an example computer processing system adapted to implement the cost oriented profiling mechanism of the present invention is shown in FIG. 1. The exemplary computer processing system, generally referenced 10, for implementing the invention comprises a general purpose computing device 11. Computing device 11 comprises central processing unit (CPU) 12, host/PIC/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores executes functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, nonvolatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium such as bubble memory storage, which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Cost Oriented Software Profiling

The cost oriented profiler (COP) mechanism of the present invention is a software development tool for analyzing the behavior of an application with respect to cost. Use of the cost oriented profiler mechanism has applications in helping drive the decisions of software architects, such as during the architecture phase of a software product where a prototype or small proof of concept project is typically built. Using the cost oriented profiler mechanism on these projects can provide the information needed to define a better cost oriented architecture.

In the current cloud era, the software developer's skill level and decision making can directly affect software TCO, as each line of code can have a large impact on the TCO, either increasing or decreasing it. For example, choosing the wrong type for a field or an SQL table entry can lead to storage waste, larger network load and higher CPU utilization. Simple optimizations for speed and/or memory consumption can find some of the problems, but not all of them. It is such situations, for example, where the cost oriented profiler mechanism of the present invention is applicable.

In addition to writing code directly, developers use off the shelf components or built-in frameworks and APIs. As these components are not typically optimized for cost, the cost oriented profiler can determine the usage of these components and offer cheaper replacements.

The term Cost Oriented Profiling (COP) is defined as a process for evaluating software projects which emphasizes the direct impact software developers and architects have on the software total cost of ownership (TCO) in the era of cloud computing, where hosting costs are charged on a "pay as you go" basis. The present invention provides a mechanism for Cost Oriented Profiling and describes the various methods used by the cost oriented profiler to evaluate software projects.

Figure 2:
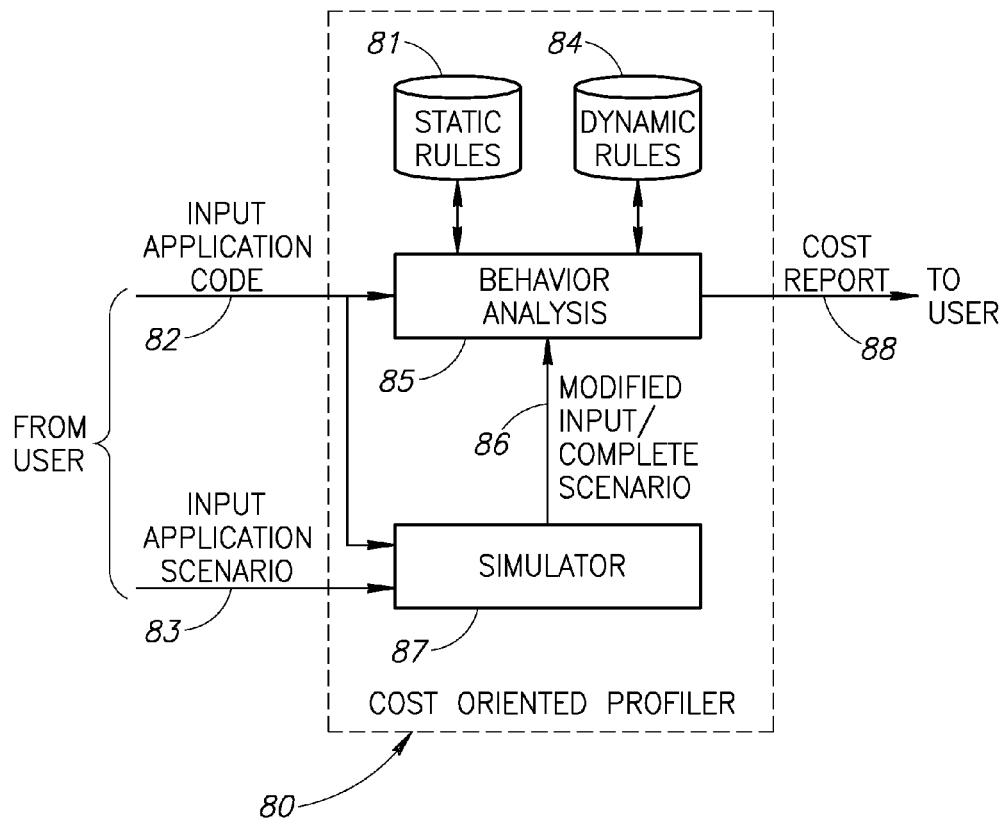
FIG. 2 is a high level block diagram illustrating an example embodiment of the cost oriented profiler mechanism of the present invention.

A high level block diagram illustrating an example embodiment of the cost oriented profiler mechanism of the present invention is shown in FIG. 2. The cost oriented profiler, generally referenced 80, comprises a behavior analysis block 85, simulator block 87, static rules database 81 and dynamic rules database 84.

The cost oriented profiler of the present invention is operative to analyze application behavior with correlation to the input application source code 82. In one embodiment, the cost oriented profiler mechanism performs behavior analysis, including static and dynamic analysis of the code, to make recommendations for reducing the software TCO and, in addition, can download a less costly replacement component that performs the same function. The profiler uses a plurality of static and dynamic analysis engines in conjunction with static rules 81 and dynamic rules 84 in its analysis of application code behavior. The behavior analysis is operative to generate a cost report 88 that is output to the user. The cost report comprises the number and actual lines of code, functions and API calls that were flagged as having an influence on the software TCO of the application. By simulating two versions of the application code, the cost oriented profiler mechanism compares the results and determines if a change to the application code will either save or waste money. The simulator 87 receives the input application code along with one or more input application scenarios 83. The output of the simulator comprises a modified application code and/or one or more completed scenarios 86, as described in more detail infra.

The cost oriented profiler mechanism is operative to analyze input application code and find those lines of code, blocks or functions that cost more on a relative basis and which can be optimized so as to reduce cost. The cost reduction is achieved by (1) performing static analysis of the code in order to find costly code patterns; (2) simulating the software and performing a dynamic analysis that finds the costly code, (3) comparing two or more simulation runs, and (4) determining if one or more candidate changes in the code improves its software TCO. In addition, if any off the shelf components, built-in frameworks or APIs are used by the application that are determined to be sub-optimal, the cost oriented profiler is operative to suggest a lower cost alternative.

Normally, Cost Oriented Development (COD) affects the layers of an application that are hosted in a cloud. These layers are more susceptible to being determined problematic by the cost oriented profiler mechanism. Layers that are located farther from the cloud (e.g., the client layers) need to be analyzed as well as they are likely to be the driver for actual scenarios involving the cloud hosted layers. Thus, the scope of analysis of the cost oriented profiler is relatively wide.

Currently, cloud service providers (e.g., Microsoft™, Google™, Amazon™, SalesForce™, Rackspace™, etc.) host their own set of supported platforms (e.g., Microsoft Azure supports the Microsoft .NET platform; others support Ruby language, Ruby on Rails, Java, etc.). In order to support multiple cloud service providers, the cost oriented profiler considers the characteristics and service specifications of each cloud service and the frameworks used to implement the associated layer of code. On the client side, client platforms vary as well, e.g., Windows™), Windows Mobile, Android™), MacOS, Linux™), iOS, etc., and their corresponding programming environment, e.g., C++ and Java VM, Microsoft .NET for Windows, Objective-C for the iOS, etc.

Static code analysis is used by the cost oriented profiler to find costly code patterns in each supported language and framework. In addition to static code analysis, the profiler performs dynamic code analysis to diagnose the connection between the client and the cloud service. Combining static and dynamic code analysis with a plurality of rules engines, the profiler is able to generate analysis results regarding the client input code which indirectly affect the cost of a cloud hosted application.

Currently, software applications hosted on a cloud provider are measured by one or more different metrics such as the number of requests, the number of computations per request, the number of machines used, the amount of bandwidth used, the amount of storage used, etc. Each cloud provider typically has its own strategy and pricing model which favors one cloud service over another. The cost oriented profiler mechanism may or may not be aware of these differences, depending on the implementation, but is able to provide two courses of action, namely: (1) to improve and recommend one factor over another which is preferred by the hosted service; and (2) to recommend cloud hosting on another cloud service which is more suitable for the current state of an application.

Static and Dynamic Rule Engines

Figure 3:
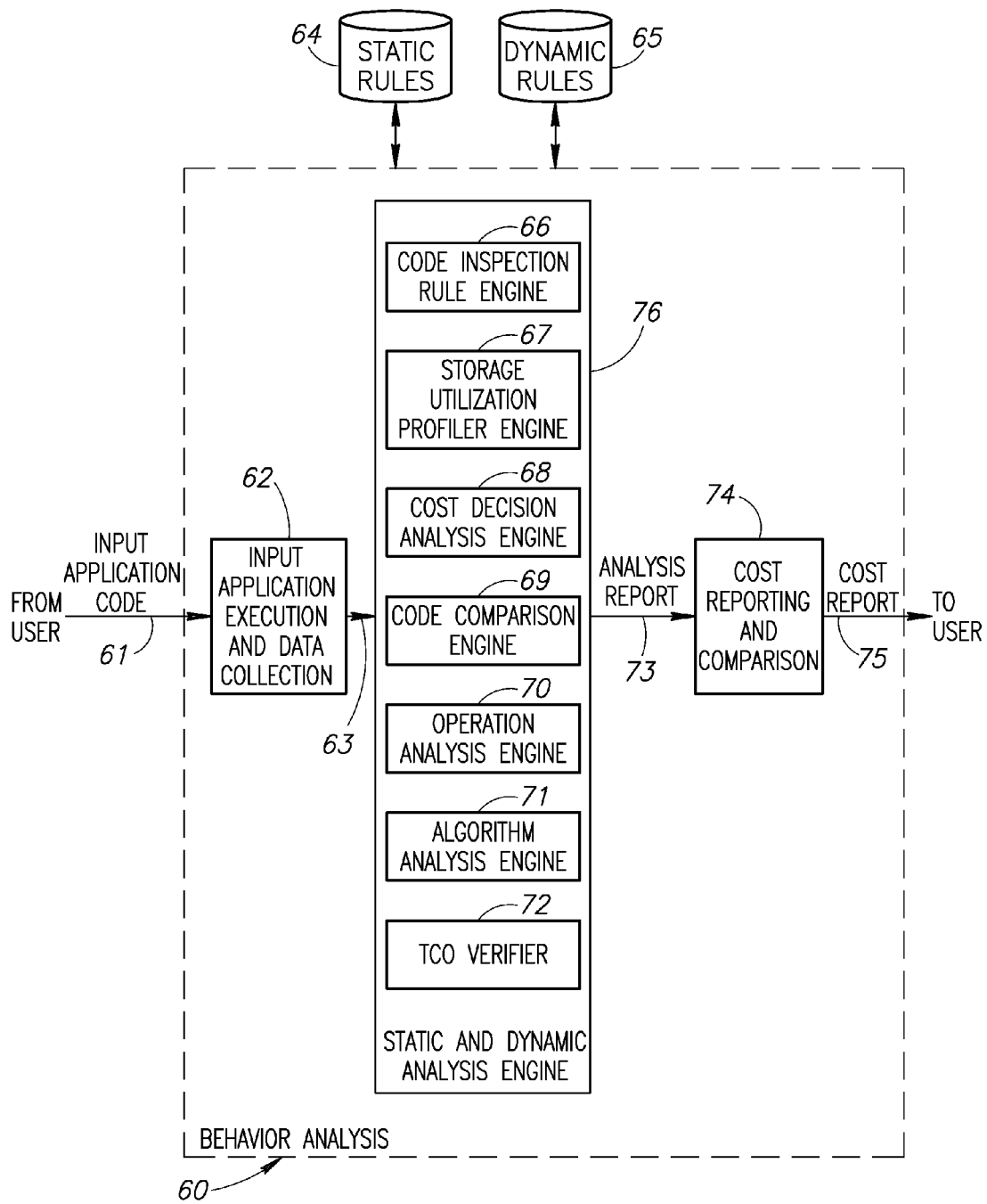
FIG. 3 is a block diagram illustrating the behavior analysis block in more detail.

A block diagram illustrating the behavior analysis block in more detail is shown in FIG. 3. In an example embodiment, the behavior analysis block, generally referenced 50, comprises an input application execution and data collection block 62, static and dynamic analysis engines block 75 and cost reporting and comparison block 74. The static and dynamic analysis engines 75 comprise a code inspection rule engine 66, storage utilization profiler engine 67, cost decision analysis engine 68, code comparison engine 69, operation analysis engine 70, algorithm analysis engine 71 and TCO verifier 72.

In operation, the cost oriented profiler employs a plurality of static and dynamic analysis engines and static and dynamic rules 64, 65, respectively, to carry out cost oriented profiling of input application code 61. Input application execution and data collection block 62 is operative to read the user input and pass appropriate data to the various analysis engines. Note that user input comprises input application code including all code files and user data such as requested scenarios to be executed. Note that the plurality of analysis engines can run either on a local development machine, an on-premise deployment server or on the cloud itself, whereby the capabilities of the rules engines can be adapted in accordance with the particular platform they are run on.

Code Inspection Rule Engine

Figure 4:
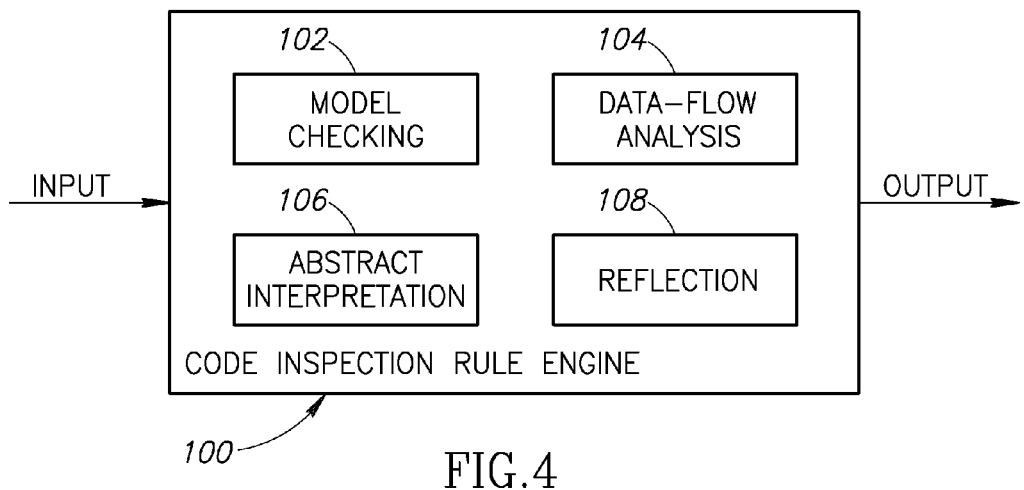
FIG. 4 is a block diagram illustrating the code inspection rule engine in more detail.

A block diagram illustrating the code inspection rule engine in more detail is shown in FIG. 4. The code inspection rule engine, generally referenced 100, comprises a model checking module 102, data flow analysis module 104, abstract interpretation module 106 and reflection module 108. In operation, the code inspection rule engine uses static analysis to check (i.e. introspect) service and client code for violations of custom programming rules and conventions related to performance and service costs.

Static program code analysis is defined as the analysis of computer software (i.e. source code) that is performed without actually executing any code. Note that analysis performed on executing programs is known as dynamic analysis. Static analysis is used in the verification of properties of software and in locating potentially costly code. According to the well-known halting problem (i.e. decide whether a program finishes running or continues to run in an infinite loop), there is neither an algorithm to solve the halting problem nor can the question of whether a given program may or may not exhibit runtime errors be answered.

Static analysis can, however, provide useful approximate solutions. Descriptions of the static analysis implementation modules used by the code inspection rule engine are provided below.

The model checking module 102 is operative to model the finite states detected in a system, which are analyzed to determine whether they meets a given specification. For example, the module answers the question whether there is a group of updates to the data store (i.e. single entry into the update state is an acceptable cost) or updates that are sent one by one (i.e. multiple entries into the update state is an unacceptable cost).

The data flow module 104 is operative to gather information about the possible set of values calculated at various points in a computer program. The control flow graph of a program is used to determine those parts of a program to which a particular value assigned to a variable might propagate. A canonical example of data-flow analysis is reaching definitions (i.e. reaching instructions in code). One way to perform data-flow analysis of a program is to set up data-flow equations for each node of the control flow graph and to solve them by repeatedly calculating the output from the input locally at each node until the whole system stabilizes, i.e. reaches a fixed point.

It is usually sufficient to obtain this information at the boundaries of basic code blocks, since from this point the information at points in the basic block can be computed. In forward flow analysis, the exit state of a block is a function of the block's entry state. This function comprises the effects of the statements in the block. The entry state of a block is a function of the exit states of its predecessors. This yields a set of data-flow equations whose cost can be summed. Note that in one embodiment, an iterative algorithm can be used to solve the data-flow equations.

The abstract interpretation module 106 is operative to model the effect each statement has on the state of an abstract machine. In other words, the module 'executes' the application software based on the mathematical properties of each statement and declaration according to the static rule database 64 (FIG. 3). The abstract machine over-approximates the behavior of the system thus making the abstract system simpler to analyze at the expense of incompleteness (i.e. not every property true of the original system is true of the abstract system). The abstract system, however, is sound (i.e. every property true of the abstract system can be mapped to a true property of the original system).

The reflection module 108 is operative to perform reflection and type introspection on the application structure. For example, in a .NET environment, introspection encompasses high-level assembly metadata down to control structures and, ultimately, individual opcodes. In addition to examining code directly through reflection, introspection is used with the capability of drilling down to the statement, expression, and Common Intermediate Language (CIL) instruction levels.

During the reflection process, the module observes and does type introspection on the structure of the input application and its behavior at runtime. Program instructions are treated as data and the execution of a block of code can be monitored and compared to a desired cost goal related to that block. Reflection enables inspection of classes, interfaces, fields and methods at runtime without requiring knowledge of the names of the interfaces, fields, methods at compile time. It also allows evaluation of the invocation of methods.

A language supporting reflection provides a number of features available at runtime: (1) the ability to discover source code constructions (e.g., code blocks, classes, methods, protocols, etc.) as a first-class object at runtime; (2) ability to convert a string matching the symbolic name of a class or function to a reference or invocation of that class or function; (3) ability to evaluate a string as if it were a source code statement at runtime.

In reflection when methods are called, various variables and the object on which it the method is called are populated to give the context of the call. Context is typically managed by accessing the caller stack programmatically. Since callers( ) is a list of the methods by which the current verb was eventually called, performing tests on callers( ) (i.e. the command invoked by the original user) allows the method to protect itself against unauthorized use. Note that compiled languages rely on their runtime system to provide information about the source code.

The static rules used by the code inspection rule engine are based on framework design guidelines related to performance and billing, and thus cost. An example of a rule is "For an expected data input (N), the cost of X iterations in code block Y is $(N)^X$". Considering the .NET environment, for example, in one embodiment, the code inspection rule engine analyzes the binary Common Intermediate Language (CIL) generated by .NET compilers and which persists in compiled EXE and DLL files. This analysis is enabled by the rich metadata that is normally a part of CIL. In addition, by analyzing assemblies directly, the cost oriented profiler is applicable to any programming language.

Storage Utilization Profiler Engine

Figure 5:
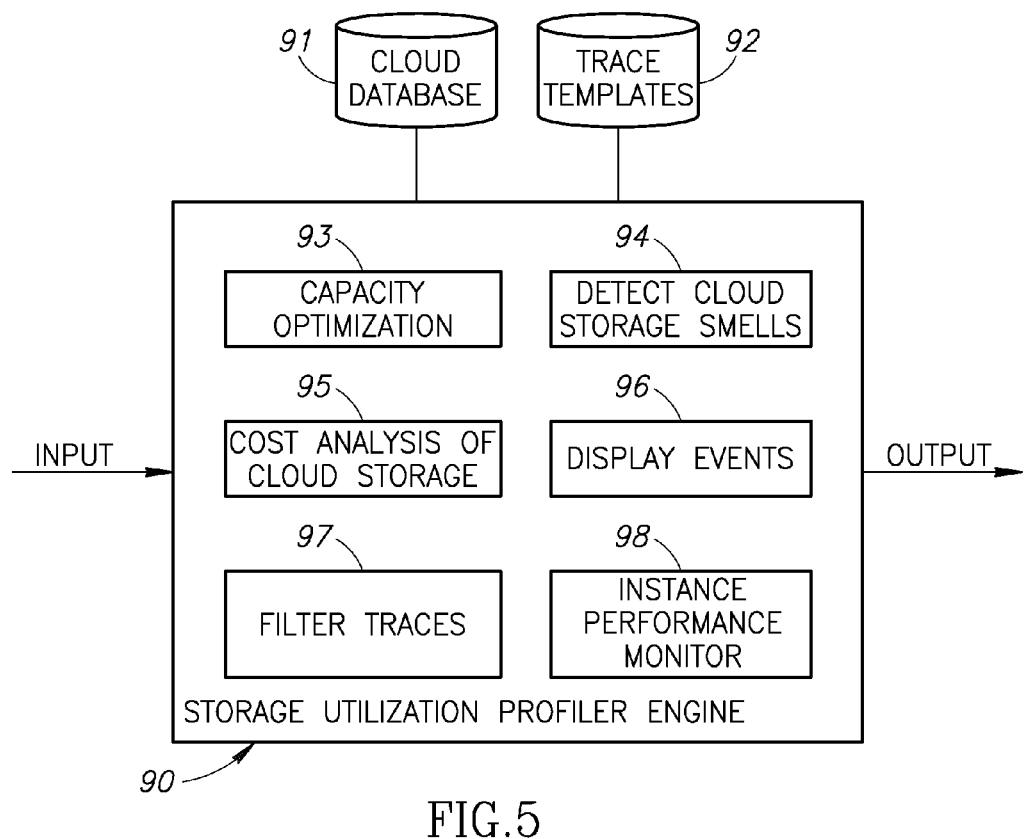
FIG. 5 is a block diagram illustrating the storage utilization profiler engine in more detail.

A block diagram illustrating the storage utilization profiler engine in more detail is shown in FIG. 5. The storage utilization profiler engine, generally referenced 90, comprises a capacity optimization module 93, cloud storage smell detection module 94, cloud storage cost analysis module 95, event display module 96, trace filter module 97 and an instance performance monitor module 98. The storage utilization profiler engine comparatively profiles cloud storage service mechanisms used by a client application.

The capacity optimization module 93 is operative to improve storage utilization costs by reducing stored data. In one embodiment, the techniques used for capacity optimization include de-duplication and data compression. De-duplication algorithms look for redundancy in sequences of bytes across comparison blocks. Using cryptographic hash functions as identifiers of unique sequences, sequences are compared to the history of other sequences, and where possible, the first uniquely stored version of a sequence is referenced rather than stored again. Considering the Windows Azure environment as an example, services may include Azure Table Services, Azure Blob Services and SQL Azure Database services. The storage utilization profiler engine comprises the following additional modules.

The cloud storage smell detection module 94 is operative to find cloud specific storage access "smells". A "code smell" is defined as any symptom in the source code of a program that possibly indicates a deeper problem. Often the deeper problem hinted by a code smell can be uncovered when the code is subjected to a short feedback cycle where it is re-factored in small controlled steps. The resulting design is then examined to determine if there are any further code smells that indicate the need of more refactoring. From the point of view of a programmer doing cost-based programming, code smells are heuristics which provide (1) an indication when to re-factor, and (2) the specific re-factoring techniques to use. Thus, a code smell is a catalyst for re-factoring to reduce cost. Examples of cost related code smells for the cloud include cross partition queries, excessively verbose result sets, non-filtered and non-paged OData queries, un-optimized storage shards and geo-location considerations.

The cloud storage cost analysis module 95 is operative to compare and contrast billing costs of different cloud storage options. In Windows Azure, for example, these include schema-less Azure Table Storage versus SQL Azure (SADB) relational storage. The COP provides code migration between these modes by analyzing data queries to determine what entities are involved. It then recommends an alternative unstructured schema, de-normalized into an Entity-Attribute-Value set of tables, as opposed to entity-relational tables. It generates corresponding data access and modification methods for this de-normalized schema as a less costly alternative and calculates the cost differential.

The event display module 96 is operative to aggregate and graphically display relevant monitored events for an instance of a cloud application's storage. In Windows Azure, for example, the COP leverages Azure Diagnostic Services to capture and save data about each event to a Blob file for analysis offline. For example, the event display module monitors a production environment to see which stored procedures are hampering performance by executing too slowly. Windows Azure Diagnostics enables collecting diagnostic data from an application running in Windows Azure. This is used for measuring performance, monitoring resource usage, traffic analysis and capacity planning and auditing. After the diagnostic data is collected it is transferred to a Windows Azure storage account for persistence. Diagnostic data is transferred to a Windows Azure storage account at scheduled intervals or on-demand. Depending on the type of diagnostic data being collected, Windows Azure Diagnostics uses either the Blob service or the Table service.

The filter trace module 97 is operative to filter traces such that only the relevant subset of the event data is collected, thereby reducing overhead to the Fabric VM instance and the monitoring process and excessive storage. Event tracing is a technique for obtaining diagnostic information about running code without the overhead of a checked build or use of a debugger. An event represents any discrete activity that is of interest, especially with respect to performance. Built-in events can be logged using event tracing, such as disk I/O and page faults, and the cloud oriented profiler defines additional event types for cost analysis.

Further, filters can be applied when viewing the events for processing. In one embodiment, event tracing is implemented in a driver by using the Windows software trace preprocessor (WPP). WPP software tracing in kernel-mode drivers supplements and enhances Windows Management Instrumentation (WMI) event tracing by adding conventions and mechanisms that simplify tracing the operation of a driver. WPP event tracing is implemented by adding C preprocessor directives and WPP macro calls to the driver source code. During an event tracing session, WPP (1) logs real-time binary messages that can subsequently be converted to a human-readable trace of driver operations; (2) replays captured event data against a local instance of a database (e.g., SQL Server or Development Fabric storage services); and (3) re-executes the saved events as they occurred originally.

All events are captured in order of occurrence and placed in a persistent store. An example of cloud application architecture is event driven programming which is a programming paradigm in which the flow of the program is determined by events such as messages from other programs. The program can be played back by running through the events retrieved from persistent store.

The instance performance monitor module 98 is operative to monitor the performance of an instance of a cloud database (e.g., SQL Azure) and identify slow-executing queries. Query optimization is a function of many relational database management systems in which multiple query plans for satisfying a query are examined and an optimal query plan is identified. This may or not be the absolute best strategy since there are numerous ways of implementing plans. There is a trade-off between the amount of time spent determining the optimal plan and the amount of time running the plan. Different database management systems use different ways of balancing this trade-off. Cost based query optimizers evaluate the resource footprint of various query plans and use this as the basis for plan selection. Typically, the resources included in cost include CPU path length, amount of disk buffer space, disk storage service time and interconnect usage between units of parallelism. The set of query plans examined is formed by examining possible access paths (e.g., primary index access, secondary index access, full file scan) and various relational table join techniques (e.g., merge join, hash join, product join). The search space can become relatively large depending on the complexity of the SQL query. There are two types of optimization: (1) logical optimization which generates a sequence of relational algebra to solve the query; and (2) physical optimization which is used to determine the means of carrying out each operation.

The storage profiler utilization engine is also operative to analyze SQL statements and stored procedures in the development fabric to determine cost optimization. In addition, activity is audited that occurred on an instance of a cloud database (e.g., SQL Azure) to arrive at a cost analysis breakdown of live usage over a sampling period. As a cloud storage application is profiled, an audit trail of events is gathered over time. Each of the events has a cost rule statistic associated with it. This cost rule statistic is sampled and statistics can be used to generate averages and totals.

Note that predefined trace templates support a generic trace for recording, such as logins, logouts, batches completed, connection information, stored procedure execution behavior over time, Transact-SQL batches that are run, execution time (in milliseconds) grouped by duration (to identify slow queries), exceptional lock events (deadlocks, lock time-out, and lock escalation events). The cost oriented profiler comprises a plurality of trace templates, including templates that define events, data columns and filters for a particular set of cost analysis functionality. The profiler permits users to add or remove events, data columns and filters to the templates.

Cost Decision Analysis Engine

Figure 6:
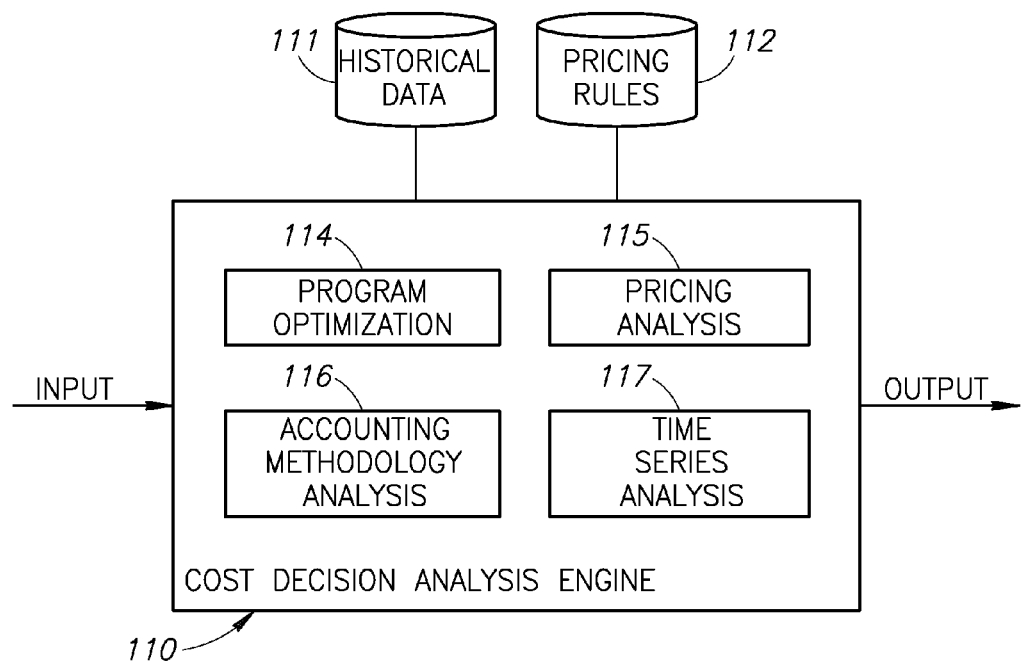
FIG. 6 is a block diagram illustrating the cost decision analysis engine in more detail.

A block diagram illustrating the cost decision analysis engine in more detail is shown in FIG. 6. The cost decision analysis engine, generally referenced 110, comprises a program optimization module 114, pricing analysis module 115, accounting methodology analysis module 116 and time series analysis module 117. As stated supra, the function of the COP is to determine how to minimize the cost of the input application code. This cost of an application is based on several factors such as transactions, compute hours, bandwidth, storage and database size. Every programming 'mistake', i.e. a non-optimal block of code that incurs more resource utilization for an operation type than required, increases TCO, e.g., non-optimized code that generates more messages and transactions than necessary.

Cost minimization is the process of modifying a software system such that it runs more efficiently or uses fewer resources. In general, a computer program may be optimized so that it (1) executes faster, (2) is capable of operating with less memory storage or other resources; and/or (3) consumes less power. The optimized system typically will only be optimal for a single application or for a single user. One may reduce the amount of time that a program takes to perform some task at the price it consuming more memory. In an application where memory space is at a premium, one may intentionally choose a slower algorithm in order to use less memory. Since there is no "one size fits all" design which is optimal in all cases, the COP is operative to recommend trade-offs to optimize the attributes of greater interest. Additionally, the effort required to modify software to be completely optimal (i.e. incapable of further improvement) almost always out weighs any benefits that would accrue. Thus, the process of optimization may be halted before a completely optimal solution has been reached. Typically, however, the COP is operative to generate the biggest improvements early in the process.

Note that optimization commonly occurs at several "levels": At the design level, the design may be optimized to make best use of the available resources. The implementation of this design benefits from a selection of efficient algorithms recommended by the COP. The implementation of these algorithms benefits from generating high quality code according to static analysis rules. Note also that the architectural design of a system significantly affects its performance. The choice of algorithm affects efficiency more than any other aspect of the design. At the source code level, avoiding poor quality coding can also improve performance by avoiding obvious program "slowdowns".

Further, code optimization leverages both cloud platform-dependent and cloud platform-independent techniques (e.g., loop unrolling, reduction in function calls, memory efficient routines, reduction in conditions, etc.). Platform-independent optimizations function to reduce the total instruction path length required to complete the program and/or reduce total memory usage during the process. Platform-dependent techniques include instruction scheduling, instruction-level parallelism, data-level parallelism and cache optimization techniques (i.e. parameters that differ among various platforms).

Optimal algorithms can be selected by performing computational tasks in several different ways with varying efficiency. The optimization entails selecting a method (i.e. algorithm) that is more computationally efficient, while retaining the same functionality. Often, a significant improvement in performance can be achieved by removing extraneous functionality.

When a costly bottleneck is localized, the COP recommends a cost saving optimization for that algorithm, tailored to the application's business case. In one embodiment, optimization includes finding a bottleneck (a critical part of the code that is the primary consumer of the needed resource) sometimes known as a hot spot. An example of a bottleneck is using the service bus as opposed to polling a queue at a rate calculated according to the peak time of day. The well-known Pareto principle can be applied to resource optimization by observing that 80% of the resources are typically used by 20% of the operations. The COP approximates that 90% of the execution time of a computer program is spent executing 10% of the code (known as the 90/10 law in this context). More complex algorithms and data structures perform well with many items, while simple algorithms are more suitable for small amounts of data, i.e. the setup, initialization time, and constant factors of the more complex algorithm can outweigh the benefit.

The pricing analysis module 115 is operative to use one or more pricing rules 112 to identify and assess the performance factors affecting cloud billing decisions and to prescribe a recommended course of action by applying the maximum expected utility action axiom to this decision. Utility is a measure of relative satisfaction, i.e. an ordinal ranking. The COP uses utility functions to justify code refactoring in terms of attempts to increase utility. Several combination utility functions based on cost type (e.g., storage cost, data transmission cost and processing cost) and statistics (e.g., maximum, average, spread, standard deviation) are considered. A model is then constructed whereby a tree of nodes of different re-factoring for cost recommendations is constructed. Each node in the decision tree has a utility function. The pricing rule generates a simple path in the tree down to a leaf node, by calculating the accumulated utility function.

Figure 7:
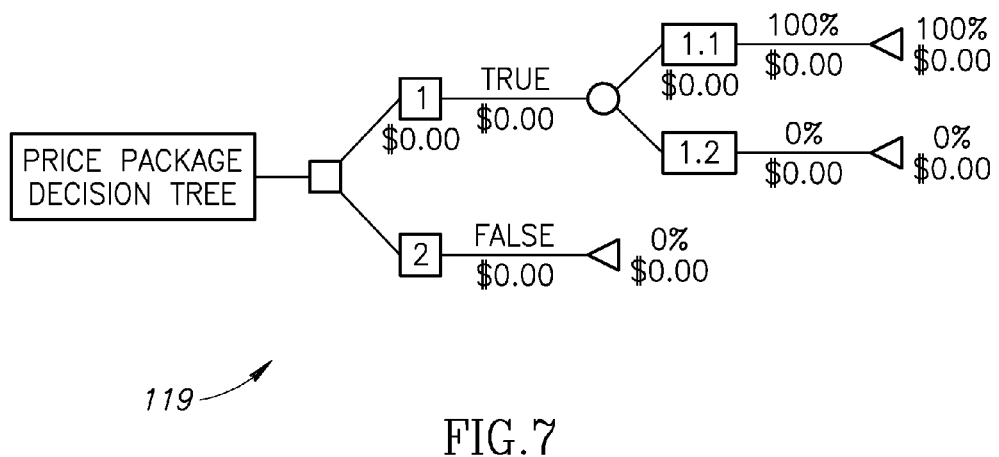
FIG. 7 is a diagram illustrating an example price package decision tree.

An example decision tree 119 is shown in FIG. 7. The decision tree represents the price package alternatives available to the decision maker, the uncertainty they face and evaluation measures representing how well they achieve their cost minimization objectives in the final outcome. Uncertainties (e.g., customer demand spikes) are represented by probabilities and probability distributions. Risk is represented by utility functions while trade-offs between conflicting objectives (e.g., SLA and compute model versus cost) is made using multi-attribute value functions or multi-attribute utility functions (if there is risk involved). In the decision tree 119, the optimum path is highlighted by the bolded boxes "1" and "1.1".

A compute hour is defined as the number of instances multiplied by "consumed" (i.e. service) hours. Note that a consumed (i.e. service) hour is not the same as uptime. For example, on Windows Azure a consumed hour is a medium size Azure instance having an average of 70% CPU peak, on a 1.60 GHZ CPU with 1.75 GB of RAM and 155 GB of non-persistent data.

The cost decision analysis engine of the COP is operative to measure the number of hours an application consumes running the application using dynamic analysis with hooks into many parts of the program. Cost is predicted based on this measurement and code optimizations to reduce consumed hours are recommended. In Worker Role batch processing, where the customer pays by compute hour, halving the instructions executed can half the cost. In addition, the COP rule base is capable of optimizing algorithms so that reducing the number of operations from N×N to N log(N) has a dramatic effect.

The accounting methodology analysis module 116 is operative to apply an accounting methodology, i.e. a method of amortized analysis based on accounting that gives an intuitive account of the amortized cost of an operation. In the cloud, each elementary operation (e.g., spinning a task on another thread, polling a queue 'X' times a minute) has a constant cost associated with it. Each aggregate operation (e.g., batch) is assigned a payment to cover the cost of elementary operations needed to complete the particular operation with some of the payment left over placed in a pool to be used later. Using amortized analysis, some of the operations will require greater than constant cost. Thus, no constant payment will be sufficient to cover the worst case cost of an operation, in and of itself. With proper selection of payment, however, this is not a problem as the expensive operations only occur when there is sufficient payment in the pool to cover their costs. For example, in capacity planning, it is often necessary to create a table before its size is known. In this case, a possible strategy is to double the size of the table when it is full.

The time series analysis module 117 is operative to evaluate the amount to be spent on purchasing cloud service resources over a given period based on a time series prediction of past performance and previous demand and optionally, one or more econometric indicators. The COP utilizes statistics to construct a time series of event costs from historical data 111 captured in traces, where a trace is a sequence of data points measured at successive times spaced at uniform time intervals. Time series analysis comprises methods for analyzing time series data in order to extract meaningful statistics and other characteristics of the data.

If a cloud service provider purchases resources above or below what is required by expected usage analysis, then this is factored into the calculation of the expected cost. For example, if trace events indicate that certain optimizations reduce cost by 10% and expected usage predicts that utilization will increase by 10% the following month, then capacity expansion can be budgeted for in a cost effective manner.

Operations Analysis Engine

Figure 8:
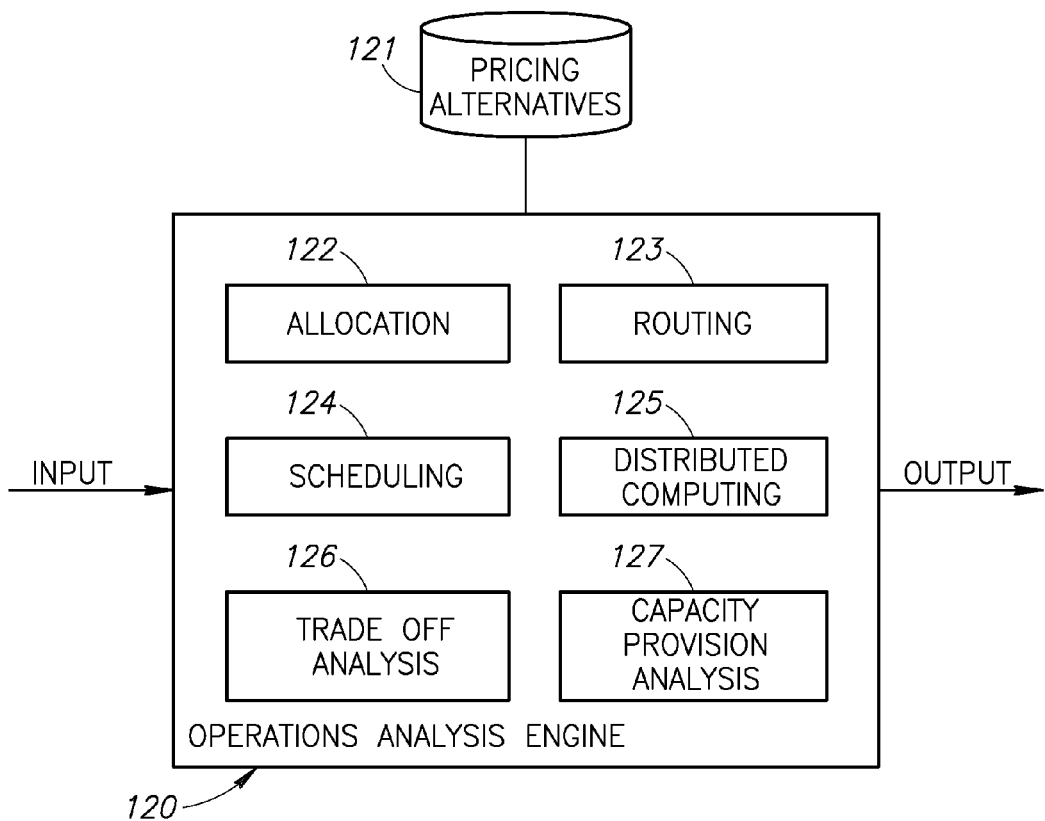
FIG. 8 is a block diagram illustrating the operations analysis engine in more detail.

A block diagram illustrating the operations analysis engine in more detail is shown in FIG. 8. The operations analysis engine, generally referenced 120, comprises an allocation module 122, routing module 123, scheduling module 124, distributed computing module 125, trade-off analysis module 126 and capacity providing analysis module 127. The operations analysis engine utilizes several analytical methods such as mathematical modeling, statistical analysis and mathematical optimization to arrive at optimal code decisions for minimizing the cost of deploying a specific application to the cloud. These method and associated modules are described in more detail hereinbelow.

The allocation analysis module 122 is operative to evaluate price/performance tradeoffs between different storage/computation alternatives using pricing alternatives database 121. For example on a Windows Azure platform, Azure Table Services, Azure Blob Services and SQL Azure Database Services. Optimization focus on improving just one or two aspects of performance: e.g., execution time, memory usage, disk space, bandwidth, power consumption or some other resource. This usually requires a trade-off, where one factor is optimized at the expense of others, (e.g., throughput versus latency). For example, increasing the size of cache improves runtime performance but also increases memory consumption. Another common trade-off includes code clarity and conciseness.

The routing analysis module 123 is operative to leverage a routing service (e.g., Azure AppFabric ESB on Windows Azure) to dynamically determine the Worker Role to utilize in a distributed cloud application. Cost based routing is essentially a path analysis whereby each leg of a route has an associated cost. This reduces to the shortest path problem from graph theory, i.e. finding a path between two vertices (or nodes) in a graph such that the sum of the weights of its constituent edges (i.e. cost) is minimized. Note that there are several variations according to whether the given graph is undirected, directed or mixed.

The COP provides a nondeterministic abstract machine (i.e. a model of the code instructions) as a graph where vertices describe states, and edges describe possible transitions. Shortest path algorithms can be used to find an optimal sequence of choices to reach a certain desired state, or to establish lower bounds on the time needed to reach a given state. The well-known Dijkstra's algorithm can be used to solve the single-source shortest path problems. For more complex scenarios, the A* search algorithm solves for single pair shortest path using heuristics to try to speed up the search, while the Floyd-Warshall algorithm solves all paired shortest paths.

The scheduling analysis module 124 is operative to leverage queues and smooth out peaks in service access requests to keep operational costs at a lower billing rate. The term scheduling refers to the way processes are assigned to run on the available limited resources. The operations analysis engine is concerned mainly with (1) throughput, i.e. the number of processes that complete their execution per time unit; (2) turnaround (or latency), i.e. the total time between submission of a process and its completion; (3) response time, i.e. the amount of time it takes from when a request was submitted until the first response is produced; and (4) fairness/waiting time, i.e. equal CPU time to each process (or more generally appropriate times according to each process' priority).

Scheduling algorithms are used for distributing resources among parties which simultaneously and asynchronously request them. The main purposes of scheduling algorithms are to minimize resource starvation and to ensure fairness amongst the parties utilizing the resources. Scheduling deals with the problem of deciding which of the outstanding requests is to be allocated resources. There are many different scheduling algorithms that are suitable for different costing rules including: FIFO, Shortest Remaining Time, Fixed Priority Preemptive scheduling, Round-Robin scheduling and Multilevel Feedback Queues.

The distributed computing module 125 is operative to optimize the cloud purchase by dynamically moving tasks. In one embodiment this involves load balancing an algorithm instance between different cloud computing host applications or moving from local servers with high usage to cloud services with idle time. A load balancing methodology is used to distribute workload across multiple compute and storage nodes to achieve optimal resource utilization, maximize throughput, minimize response time and avoid overload, thereby optimizing cost. Distribution points can be identified via code analysis as service boundary points between parts of the application. These can be replaced with load balancing relays that forward requests to one of the "backend" services which usually replies to the load balancer. This allows the load balancer to reply to the calling component without the caller ever knowing about the internal separation of functions.

Note that optimization techniques typically focus on improving just one or two aspects of an algorithm's performance, such as execution time, memory usage, disk space, bandwidth, power consumption or some other resource. This typically requires a trade-off (via the trade-off analysis module 126) where one factor is optimized at the expense of others. For example cloud storage costs versus cloud compute costs versus transmission costs. A space-time or time-memory tradeoff is created where memory use can be reduced at the cost of slower program execution and conversely, the computation time can be reduced at the cost of increased memory use, in accordance with the relative costs of processing and storage. Several types of tradeoffs include lookup tables versus recalculation, compressed versus uncompressed data, re-rendering versus stored images and smaller code versus loop unrolling.

The capacity provision analysis module 127 is operative to analyze the amount of storage actually used by an algorithm in order to provision at an optimal cost/capacity point. Examples of techniques used include thin provisioning, capacity reclamation and storage monitoring. Detailed operation of the capacity provision analysis mechanism was described supra in connection with the storage utilization profiler engine 90 (FIG. 5).

Algorithm Analysis Engine

Figure 9:
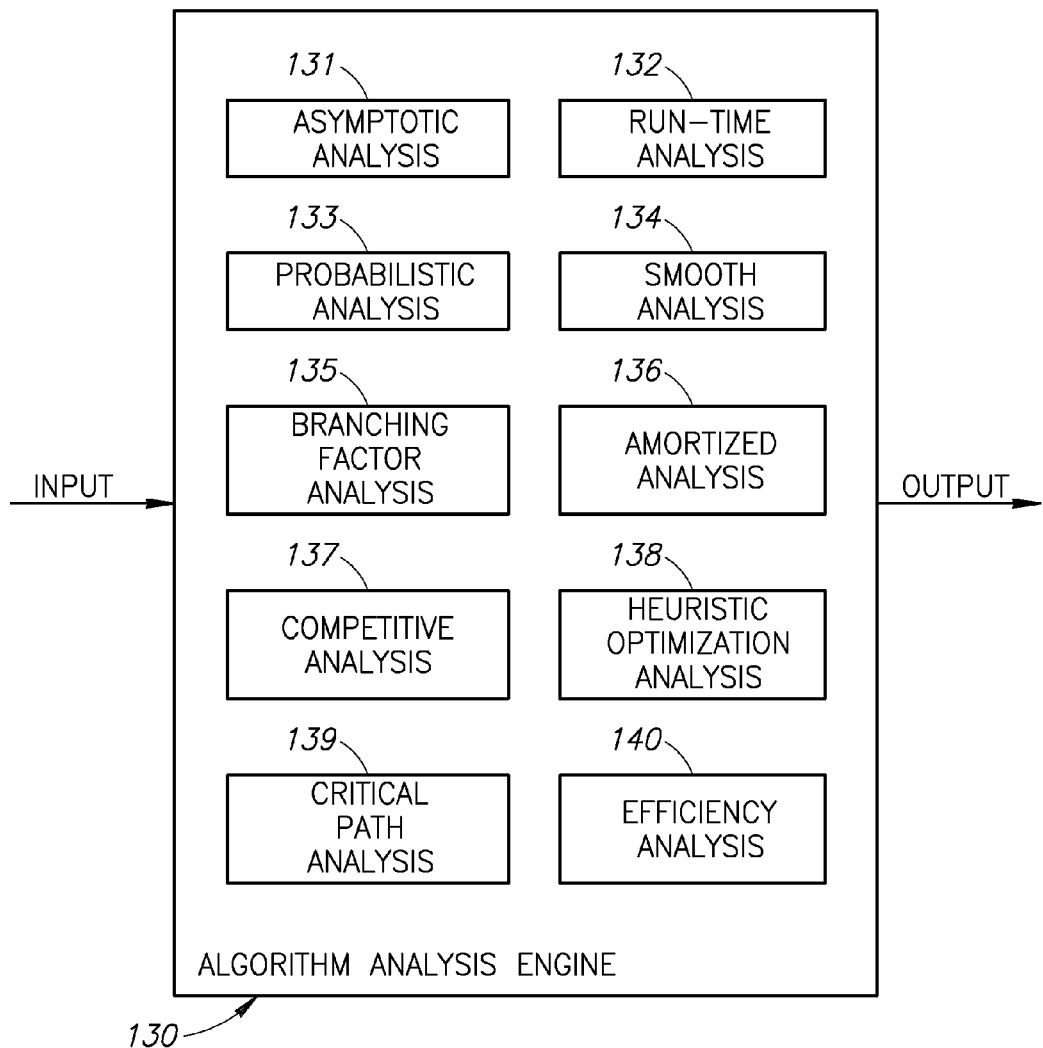
FIG. 9 is a block diagram illustrating the algorithm analysis engine in more detail.

A block diagram illustrating the algorithm analysis engine in more detail is shown in FIG. 9. The algorithm analysis engine, generally referenced 120, comprises an asymptotic analysis module 131, run-time analysis module 132, probabilistic analysis module 133, smooth analysis module 134, branching factor analysis module 135, amortized analysis module 136, competitive analysis module 137, heuristic optimization analysis module 138, critical path analysis module 139 and efficiency analysis module 140.

As described supra, the COP is operative to determine the amount of resources (e.g., time and storage) necessary to execute a cloud application operation. The majority of applications comprise a plurality of algorithms. Resource optimization is usually achieved by running superior algorithms. Most algorithms are designed to work with inputs of arbitrary length. Usually, the efficiency or run time of an algorithm is estimated as a function relating the input length to the number of steps (i.e. time complexity) or storage locations (i.e. space complexity). These estimates can be used to direct a search for efficient algorithms. For Web Roles, this enables estimating scalability requirements and thus the compute model and service level agreement (SLA) to purchase; for Worker Roles which are essentially batch operations, this enables determining the amount of work that can be done per billable hour, thus providing a cost analysis.

For example, on Windows Azure, a tenant VM needs a discrete amount of time to execute each of the instructions involved with carrying out a customer's algorithm. Although the specific amount of time to carry out a given instruction varies depending on which instruction is being executed, it is deterministic. The COP uses the highest-order term in any given function as the dominating factor of its rate of growth which defines its run-time order and thus billable cost.

The algorithm analysis engine comprises a plurality of modules to analyze the algorithms in an application. Based on the analysis, the COP is operative to generate an estimate of the software cloud billing costs along with optimization recommendations.

Algorithm Asymptotic Analysis

The algorithm asymptotic analysis module 131 is operative to estimate a cloud operation's complexity asymptotically (i.e. for arbitrarily large input sets) to determine the number of compute steps per billable hour. Asymptotic estimates provide useful information because different implementations of the same algorithm may differ in efficiency. The efficiencies of any two "reasonable" implementations of a given algorithm, however, are related by a constant multiplicative factor called a hidden constant.

The algorithm analysis engine performed asymptotic analysis in order to the determine limiting behavior of an algorithm and to calculate the price point for purchasing a cloud service pack at which further spending exhibits diminishing returns. Examples include the performance of algorithms when applied to very large input data or the behavior of physical systems when they are very large. It also uses the well-known method of dominant balance (i.e. iterative asymptotic expansion) to determine the asymptotic behavior of an algorithm without solving it. \

Asymptotic computational complexity is the usage of the asymptotic analysis for the estimation of computational complexity of algorithms and computational problems. The most commonly estimated computational resources include the asymptotic time complexity and asymptotic space complexity. The term "computational complexity" refers to the upper bound for the asymptotic computational complexity of an algorithm or problem, usually written in terms of the big O notation, e.g., $O(n^3)$. An algorithm is said to be asymptotically optimal if, for large inputs, it performs at worst a constant factor (independent of the input size) worse than the best possible algorithm. The COP is operative to detect a comparison sort block of code by its instruction signature. It is well-known that all comparison sorts require at least $\Omega(n \log n)$ comparisons in the average and worst cases. Mergesort and heapsort are comparison sorts which perform $O(n \log n)$ comparisons, thus they are asymptotically optimal in this sense. If the input data has some a priori properties which can be exploited in construction of an algorithm, in addition to comparisons, then asymptotically faster algorithms may be possible.

For example, if it is known that N objects are integers in the range [1 . . . N], then they may be sorted O(N) times, e.g., by the bucket sort. A consequence of an algorithm being asymptotically optimal is that, for large enough inputs, no algorithm can outperform it by more than a fixed constant factor, such as 30%. For this reason, asymptotically optimal algorithms are often the "end of the line", i.e. a result that cannot be significantly improved upon. Conversely, if an algorithm is not asymptotically optimal, this implies that as the input grows in size, the algorithm performs increasingly worse than the best possible algorithm. The asymptotic algorithm module attempts to find algorithms that perform better, even if they do not enjoy any asymptotic advantage, as they are likely to be less costly.

Algorithm Run-Time Analysis

The algorithmic run-time analysis module 132 is operative to estimate the increase in running time (or run-time) of an algorithm as its input size (usually denoted as n) increases. The run-time complexity for the worst-case scenario of a given algorithm is evaluated by examining the structure of the algorithm and making one or more simplifying assumptions, thus providing an estimate of cloud operation costs. Note that a program can take seconds, hours or even years to finish executing, depending on which algorithm(s) it implements.

Since algorithms are platform-independent (i.e. a given algorithm can be implemented in an arbitrary programming language on an arbitrary computer running an arbitrary cloud operating system), there are disadvantages to using an empirical benchmark approach to gauge the comparative performance of a given set of algorithms. For example, consider a program that looks up a specific entry in a sorted list of size n. Suppose this program were implemented on Computer A, a state-of-the-art machine, using a linear search algorithm, and on Computer B, a much slower machine, using a binary search algorithm. Benchmark testing on the two computers running their respective programs may yield the conclusion that Computer A is running an algorithm that is far superior in efficiency to that of Computer B.

If the size of the input list is increased to a sufficient number, however, that conclusion may be shown to be wrong. If Computer A, running the linear search program, exhibits a linear growth rate, then the program's run-time is directly proportional to its input size, i.e. doubling the input size doubles the run time, quadrupling the input size quadruples the run-time, etc. On the other hand, Computer B, running the binary search program, exhibits a logarithmic growth rate, i.e. doubling the input size only increases the run time by a constant amount. Even though Computer A is apparently a faster machine, Computer B will eventually surpass Computer A in run-time because it is running an algorithm with a much slower growth rate.

An algorithm exhibits a growth rate on the order of a mathematical function if beyond a certain input size n, the function $f(n)$ times a positive constant provides an upper bound or limit for the run-time of that algorithm. In other words, for a given input size n greater than some $n_0$ and a constant c, the run time of that algorithm will never be larger than $c \times f(n)$. This concept is expressed using well-known big O notation.

For example, since the run-time of insertion sort grows quadratically as its input size increases, insertion sort can be said to be of order $O(n^2)$. The run-time complexity for the worst-case scenario of a given algorithm can be evaluated by examining the structure of the algorithm and making one or more simplifying assumptions. Consider the following pseudocode in Listing 1 below.

---
Listing 1: Example Algorithm Pseudocode
---
1    obtain a positive integer from the input
2    if n > 10
3      print "This might take a while..."
4    for i = 1 to n
5      for j = 1 to i
6        print i * j
7    print "Done!"
---

Given the above algorithm, a computer takes a discrete amount of time to execute each of the instructions involved with carrying out this algorithm. The specific amount of time to carry out a given instruction varies depending on which instruction is being executed and which computer is executing it, but on a conventional computer, this amount will be deterministic. Assume that the actions carried out in step 1 are considered to consume time $T_1$; step 2 consumes time $T_2$, and so forth. In the algorithm above, steps 1, 2 and 7 are only run once. For a worst-case evaluation, it is assumed that step 3 will be run as well. Thus the total amount of time to run steps 1 to 3 and step 7 is given below.

$$T_1 + T_2 + T_3 + T_7. \quad (1)$$

The loops in steps 4, 5 and 6 are more difficult to evaluate. The outer loop test in step 4 will execute (n+1) times (note that an extra step is required to terminate the 'for' loop, hence n+1 rather than n executions), which will consume $T_4(n+1)$ time. The inner loop, on the other hand, is governed by the value of i, which iterates from 1 to n. On the first pass through the outer loop, j iterates from 1 to 1. The inner loop makes one pass, thus running the inner loop body (step 6) consumes $T_6$ time, and the inner loop test (step 5) consumes $2T_5$ time. During the next pass through the outer loop, j iterates from 1 to 2, the inner loop makes two passes, thus running the inner loop body (step 6) consumes $2T_6$ time, and the inner loop test (step 5) consumes $3T_5$ time. Altogether, the total time required to run the inner loop algorithm body can be expressed as an arithmetic progression which can be factored. The total time required to run the inner loop test is evaluated and factored similarly as shown in Equation 2 below.

$$f(n) = \left[\frac{1}{2}(n^2 + n)\right]T_6 + \left[\frac{1}{2}(n^2 + 3n)\right]T_5 + (n+1)T_4 + T_1 + T_2 + T_3 + T_7 \quad (2)$$

Note that the highest order term in any given function dominates its rate of growth and thus defines its run-time order. In this example, $n^2$ is the highest-order term, thus $f(n)=O(n^2)$.

Note further that algorithm runtime analysis is useful in cost analysis since use of an inefficient algorithm can significantly impact system performance. In cost-sensitive applications, an algorithm that takes too long to run can rack up huge costs for its user. An inefficient algorithm can also require a costly amount of computing power or storage in order to run, again rendering it highly cost inefficient.

Algorithm Probabilistic Analysis

The probabilistic analysis module 133 is operative to estimate the computational complexity of an algorithm or a computational problem starting from an assumption about a probabilistic distribution of the set of all possible inputs. This assumption is then used to generate an efficient algorithm or to derive the complexity of a known algorithm.

Bayesian inference is a method of statistical inference in which evidence is used to estimate the probability that a hypothesis is true. Bayes' theorem can be applied to any data that has been converted into Bayesian probabilities, such as cost based coding decisions. Bayesian inference is an iterative process in which a collection of new evidence repeatedly modifies an initial confidence in the truth of a hypothesis. During each iteration, the initial belief is called the prior probability, whereas the modified belief is called the posterior probability.

A naive Bayes classifier is a simple probabilistic classifier based on applying Bayes' theorem with strong (i.e. naive) independence assumptions. A naive Bayes classifier assumes that the presence (or absence) of a particular feature of a class is unrelated to the presence (or absence) of any other feature. Even if these features depend on each other or upon the existence of the other features, a naive Bayes classifier considers all of these properties to independently contribute to the probability that an analyzed code block has a likely cost. An advantage of the naive Bayes classifier is that it only requires a small amount of training data to estimate the parameters (means and variances of the variables) necessary for classification. Because independent variables are assumed, only the variances of the variables for each class need to be determined and not the entire covariance matrix.

Algorithm Smoothed Analysis

The smoothed analysis module 134 is operative to use smoothed analysis to realistically measure the complexity of an algorithm, yielding a more realistic performance analysis of an algorithm, as opposed to using worst-case or average-case scenarios. Smoothed analysis measures the expected performance of algorithms under slight random perturbations of worst-case inputs. If the smoothed complexity of an algorithm is low, then it is unlikely that the algorithm takes long to solve practical instances whose data are subject to slight noises and imprecision.

In statistics, a data set is smoothed to create an approximating function that attempts to capture important patterns in the data, while leaving out noise or other fine-scale structures/rapid phenomena. A variety of different algorithms are used in smoothing. A common algorithm is the "moving average", used to analyze a set of data points by creating a series of averages of different subsets of the full data set. Given a series of numbers and a fixed subset size, the moving average is obtained by first taking the average of the first subset. The fixed subset size is then shifted forward, creating a new subset of numbers, which is averaged. This process is repeated over the entire data series. The plot line connecting all the averages is the moving average. A moving average is commonly used with time series data to smooth out short-term fluctuations and highlight longer-term trends or cycles.

Algorithm Branching Factor Analysis

The branching factor analysis module 135 is operative to calculate the branching factor which is the number of children at each node in the instruction steps of an algorithm. If the branching factor is not uniform, an average branching factor is calculated. Calculating the branching factor helps reduce computationally expensive combinatorial explosions by applying a pruning algorithm and cutoff thresholds. Higher branching factors are computationally more expensive due to the exponentially increasing number of nodes, leading to combinatorial explosion.

For example, if the branching factor is 10, then there are 10 nodes one level down from the current position, $10^2$ (or 100) nodes two levels down, $10^3$ (or 1,000) nodes three levels down, etc. The higher the branching factor, the faster the "explosion" occurs. The branching factor can be reduced by a pruning algorithm. Pruning is a technique that reduces the size of decision trees by removing sections of the tree that provide little power to classify instances. Pruning can occur in a top down or bottom up fashion. A top down pruning traverses nodes and trims subtrees starting at the root, while a bottom up pruning starts at the leaf nodes.

Reduced error pruning is one form of pruning Starting at the leaves, each node is replaced with its most popular class. If the prediction accuracy is not affected then the change is kept. Reduced error pruning has the advantage of simplicity and speed.

In cost complexity pruning, a series of trees is generated. This is a recursive process whereby the subtree that minimizes the branching factor is chosen for removal. Once the series of trees has been created, the optimum tree is chosen by generalized accuracy as measured by a training set or cross-validation.

Algorithm Amortized Analysis

The amortized analysis module 136 is operative to find the average running time per algorithmic operation over a worst-case sequence of operations. The method requires knowledge of which series of operations are possible. This is the case, for example, with Azure storage data structures, which have states that persist between operations. In one embodiment, a worst case operation alters the state in such a way that the worst case will occur again for a relatively long time, thus "amortizing" its cost.

It is noted that average-case analysis and probabilistic analysis of probabilistic algorithms are not equivalent to amortized analysis. In average-case analysis, an average is taken over all possible inputs. In probabilistic analysis of probabilistic algorithms, an average is taken over all possible random choices. In amortized analysis, an average is taken over a sequence of operations. Amortized analysis assumes worst-case input and typically does not permit random choices.

Aggregate analysis determines the upper bound T(n) on the total cost of a sequence of n operations, and then calculates the average cost to be T(n)/n. The accounting method determines the individual cost of each operation, combines its immediate execution time and its influence on the running time of future operations. More common short-running operations accumulate a "debt" of unfavorable state in small increments, while less common long-running operations decrease it significantly. This method is similar to the accounting method, but overcharges operations early to compensate for undercharges later.

As an example, consider a specific implementation of a dynamic array wherein the application doubles the size of the array each time it fills up. Due to this, array reallocation may be required and in the worst case an insertion may require O(n) time. A sequence of n insertions, however, can be performed in O(n) time. Since the remainder of the insertions is performed in constant time, n insertions can be completed in O(n) time. The amortized time per operation is therefore O(n)/n=O(1).

In another example, consider a sequence of n operations. There are two possible operations: (1) a regular insertion which requires a constant c time to perform assuming c=1; and (2) an array doubling which requires O(j) time (where j<n and is the size of the array at the time of the doubling). The time to perform these operations is less than the time needed to perform n regular insertions combined with the number of array doublings that would have taken place in the original sequence of n operations. There are only as many array doublings in the sequence as there are powers of two between 0 and n (log(n)). Therefore, the cost of a sequence of n operations is strictly less than the expression below.

$$n + \sum_{j=0}^{\lfloor \lg(n) \rfloor} 2^j = 3n \qquad (3)$$

The amortized time per operation is the worst-case time bound on a series of n operations divided by n. The amortized time per operation is therefore O(3n)/n=O(n)/n=O(1).

Algorithm Competitive Analysis

The competitive analysis module 137 is operative to apply a competitive analysis to analyze online algorithms exposed in the cloud, in which the performance of a service (which must satisfy an unpredictable sequence of requests, each request being completed without knowledge of the future) is compared to the performance of an optimal offline algorithm that views the sequence of requests in advance. An algorithm is competitive if its competitive ratio, i.e. the ratio between its performance and the offline algorithm's performance, is bounded. Unlike traditional worst-case analysis, where the performance of an algorithm is measured only for "hard" inputs, competitive analysis requires that an algorithm perform well both on hard and easy inputs, where "hard" and "easy" are defined by the performance of the optimal offline algorithm. To achieve this, the run time analysis is performed on an ideal set of inputs and this is compared to the run time analysis of random inputs.

Algorithm Heuristic Optimization Analysis

The heuristic optimization analysis module 138 is operative to inspect an algorithm and recommend general optimization heuristics to reduce costs: The recommendations are based on common code smells identified from the static and dynamic rule bases whereby several code re-factoring for algorithms are suggested and include: (1) indexing; (2) binary search; (3) caching; (4) table lookups and hash functions; (5) reduction of data granularity; (6) identifying the correct numerical types to use; (7) storage capacity planning to reduce costly unplanned dynamic storage excesses; (8) reduction of excessive use of function calls that bloat call stack overhead (e.g., use of tail recursion); (9) lazy loading; (10) use of immutable objects; and (11) reducing multiple passes of arrays.

Algorithm Critical Path Analysis

The critical path module 139 is operative to identify those processes in a complex algorithm that affect the overall duration of the cloud operation. The critical path method (CPM) comprises an algorithm for scheduling a set of workflow code activities. In the CPM a model of the code workflow is constructed that includes the following: (1) a list of all activities required to complete the function; (2) the time (i.e. duration) that each activity takes to complete; and (3) the dependencies between the activities. Using these values, CPM calculates the longest path of planned activities to the end of the workflow, and the earliest and latest that each activity can start and finish without increasing process execution time. This process determines which activities are "critical" (i.e. on the longest path) and which have "total float" (i.e. can be delayed without making the process longer). A critical path is the sequence of workflow activities that has the longest overall duration. This determines the shortest time possible to complete the process. Any delay of an activity on the critical path directly impacts the execution cost. A workflow can have several parallel near critical paths.

Algorithmic Efficiency Analysis

The efficiency analysis module 140 is operative to measure one or more software metrics regarding the application code. In particular, the efficiency analysis module functions to analyze properties of an algorithm to determine how much of various types of resources it consumes, and thus its operational cost. For a repeating or continuous process, it lowers costs by reducing resource consumption, including time to completion, to some acceptable optimal level. For each algorithm, the efficiency analysis module analyzes various software metrics, for example: speed or running time complexity, space complexity (in terms of memory), transmission size, storage size (i.e. size of required 'long term' disk space required after its operation to record its output or maintain its functionality during its lifetime), and TCO during its lifetime.

The following algorithmic efficiency mechanisms of analysis are employed in parallel. Note that any or all of the mechanisms may be used depending on the particular implementation and as called for in response to analysis of the input application code.

In a first mechanism, well-known programming techniques and 'avoidance strategies', e.g., the re-ordering of nested conditional statements, is applied to put the least frequently occurring condition first to reduce actual instruction path length.

In a second mechanism, algorithmic efficiency evaluation attempts to minimize the time necessary for completing the calculation of an algorithm, and thus lower costs. The precise 'arrangement of processes' is critical in reducing elapse time.

In a third mechanism, the speed of an algorithm for a given input is analyzed. In one embodiment, the speed is measured as a function of the execution duration (or clock time) and the results are averaged over several executions to eliminate possible random effects. The mechanism is operative to consider parallel processes occurring on the same physical machine, leveraging task and data parallelization patterns.

In a fourth mechanism, the relative measure of an algorithm's performance is inferred from the total instruction path length which is determined by a run time Instruction Set Simulator.

In a fifth mechanism, time complexity is evaluated to determine the big-O of an algorithm. Note that big O notation is used to classify algorithms by how they respond (e.g., in their processing time or working space requirements) to changes in input size. Big O notation mathematically characterizes functions according to their growth rates.

In a sixth mechanism, run-time analysis is used to estimate the speed of a particular algorithm in accordance with its type (e.g., sort, search, etc) and in terms of scalability, its dependence on 'size of input' (i.e. payload size which affects transmission cost), processor power and other billable factors.

Often, it is possible to speed up an algorithm at the expense of memory. In a seventh mechanism, memory requirements of an algorithm are evaluated and used in recommending the optimal price/performance compute package. The memory requirement of an algorithm is based on the amount of temporary "dynamic memory" allocated during processing.

In an eighth mechanism, a cost/benefit analysis of the re-materialization of an algorithm is performed. Re-materialization (i.e. re-calculation) can be more efficient and/or cost-effective than memorization (retrieving results from cache). This is most likely the case when a calculation is very fast (e.g., addition or bitwise operations), while the amount of data to be cached is very large, resulting in inefficient and relatively expensive storage.

In a ninth mechanism, a cost/benefit analysis of pre-computation is performed. Pre-computing a complete range of results at the beginning of an algorithm's execution is advantageous when one or more inputs is constrained to a small enough range such that the results can be stored in a reasonably sized block of memory. Since memory access is essentially constant in time complexity (except for caching delays), any algorithm with a component having worse than constant efficiency over a small input range can be improved by pre-computing values. In some cases, efficient approximation algorithms are obtained by computing a discrete subset of values and interpolating for intermediate input values, since interpolation is also a linear operation.

In a tenth mechanism, transmission and storage size (and thus costs) are reduced by determining key points where data compression algorithms can be applied to reduce the consumption of expensive resources, such as hard disk space or transmission bandwidth. Storage and transmission costs are reduced by encoding information using fewer bits than the original representation uses. Compression is useful as it helps reduce the consumption of expensive resources such as hard disk space or transmission bandwidth. Compressed data, however, must be decompressed to be used and this additional processing may be undesirable in some applications. Trade-offs are considered among various factors including (1) the degree of compression, (2) the amount of distortion introduced (i.e. how lossy the compression scheme is), and (3) the computational resources required to compress and uncompress the data.

Code Comparison Engine

Figure 10:
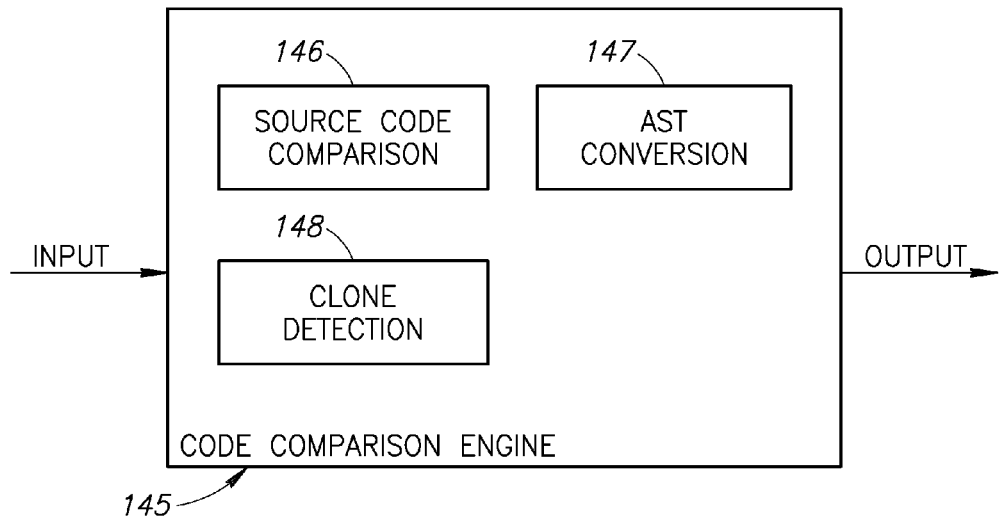
FIG. 10 is a block diagram illustrating the code comparison engine in more detail.

A block diagram illustrating the code comparison engine in more detail is shown in FIG. 10. The code comparison engine, generally referenced 145, comprises a source code comparison module 146, AST conversion module 147 and clone detection module 148. The COP is operative to correlate the cost of the application with its parts, i.e. source code, or other representation of the code such as Common Intermediate Language (CIL), Abstract Syntax Tree (AST), or function call stack. The COP calculates the cost of each of the above elements. A software developer can use the calculation results of the COP process to optimize the costly areas in the source code. The COP is run an additional time on the modified application code to obtain the results of the optimization process. The code comparison engine is operative to compare the results of the two COP runs, the second run with the changed source code.

The comparison process is based on finding those portions of the code that have not been changed and marking them as anchors. Cost differentiation can optionally be provided for these anchors. Further comparison can be based on similarities that can be found in the portions that have changed. In addition, changes can also be obtained from the programming editor, i.e. following the program editing process, to obtain the correlation between the old and the new code.

The operation of the code comparison engine will now be described in more detail. The primary goal of the code comparison engine is to compare one or more code blocks in a large source code base. A block of cloned code typically shows similarity (i.e. basic pattern matching) to some other block of code. One way to define any measure of similarity over blocks of code is to compare all of them using the source code comparison module 146. Those blocks with the same similarity are potential clones.

In one embodiment, Abstract Syntax Tree (AST) based matching is used where several open source C# parser libraries support conversion of source code into ASTs using AST conversion module 147. Programs have structure induced by the grammar rules of the language. The clone detection module 148 is operative to use this to find clones efficiently by hashing on arbitrary substructures of the program (i.e. identifiers, expressions, statements, declarations, function headers and statement sequences) encoded as compiler data structures called abstract syntax trees (ASTs).

In the case of large applications (e.g., a million lines of code to be analyzed), time matters a great deal. The hashing process described above essentially makes a $N^2$ computation essentially linear in time. Once a small clone has been identified, it and neighboring clones are merged to form larger ones. The gap between the closes becomes one or more parameters to the clone and may be other arbitrary program structures including identifiers, expression, statements, etc. The benefits of this technique include (1) detected clones match code chunks that programmers are likely to optimize; (2) detected clones comprise parameters for points of variation, and the clone detection module is capable of finding clones regardless of program formatting since the abstract syntax trees are generated by a compiler-accurate front end parser for the language.

TCO Verifier

Figure 11:
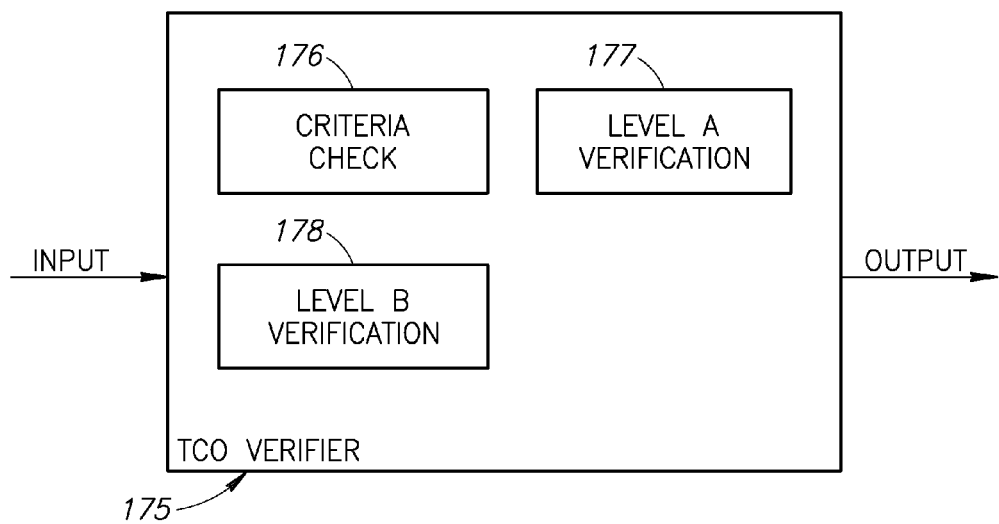
FIG. 11 is a block diagram illustrating the TCO verifier in more detail.

A block diagram illustrating the TCO verifier in more detail is shown in FIG. 11. The TCO verifier, generally referenced 175, comprises a criteria check module 176, level A verification module 177 and level B verification module 178. The TCO verifier provides a mechanism for users to test an input application to determine whether it is written good enough to be considered "TCO-Verified". A "TCO-Verified" mark serves as the standard for well-written cloud applications.

To be considered TCO-Verified, the input application is put through server-side and client-side static and dynamic analysis utilizing the engines 66, 67, 68, 69, 70, 71 (FIG. 3) described supra, which result in a "successful" verification. Failing in one or more of the analysis engines prevents the application from becoming "TCO-Verified".

An application is considered TCO-Verified if the following conditions are met. Note that, depending on the implementation, either all conditions or a part thereof may be required for TCO verification. Note that a TCO-Verified application retains that status until the application code changes. After any change in the code the TCO Verifier must be re-run.

First, the application code must have gone through static and dynamic analysis using the various cost analysis rule engines 66, 67, 68, 69, 70, 71 (FIG. 3) described supra. Second, a high code-coverage percentage must have been achieved, i.e. the cost oriented profiling process measured the cost of most code-lines or code blocks. Third, a small percentage of cost related rules were found to be broken. Fourth, the overall cost of the application and/or a business request is lower than the cost of comparable applications/algorithms. The cost of the "comparable applications/algorithms" is benchmarked in advance for different pricing packages utilizing different cloud vendors and, in one embodiment, is made available to users via a web service or a locally installed database. Further, the classification of the examined application/algorithm into the appropriate category for comparison is done utilizing the algorithm analysis engine 71 which can describe a given application via a set of measurable metrics, as described in more detail supra.

In one embodiment, one of two TCO-Verified status levels are possible: a level A verification determined by level A verification module 177 and a level B verification determined by level B verification module 178. Note that it is appreciated that any number of verification levels may be used depending on the particular implementation.

Figure 12:
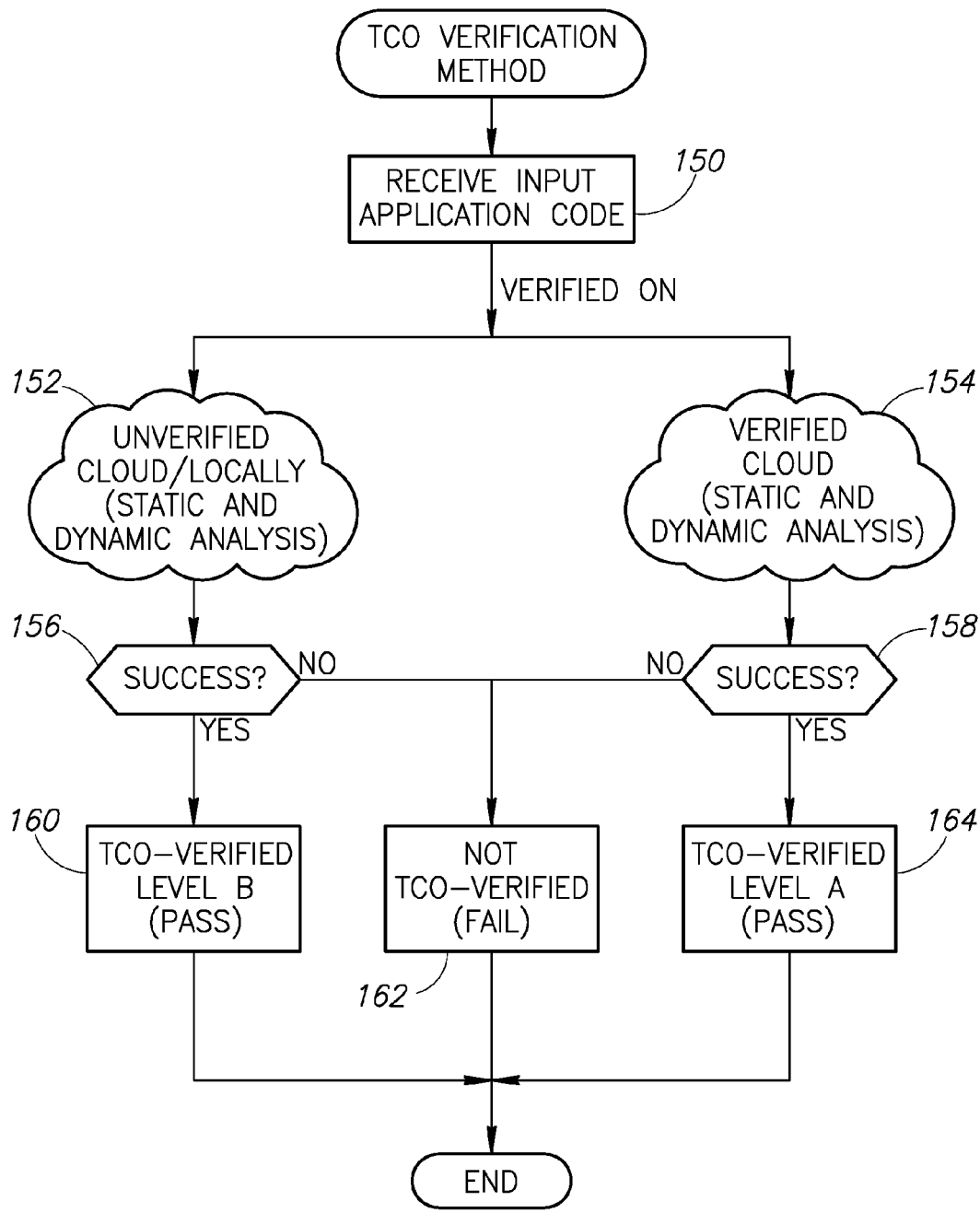
FIG. 12 is a flow diagram illustrating the TCO verification method.

A flow diagram illustrating the TCO verification method is shown in FIG. 12. The input application code is received (step 150) and put through the code analysis engines 66, 67, 68, 69, 70, 71 either in a cloud environment or a local machine/cloud simulation development environment.

Level A verification is the highest level of verification. To obtain this verification level, the level A verification module is operative to run the TCO verification process on a verified cloud environment (step 154). In other words, the input application is analyzed while it is deployed in the cloud. This enables the analysis process itself to be precise as all cloud side-effects such as network traffic, communication, etc. are taken into account. If the input application code passes the criteria described above (step 158) then the application code is TCO-verified level A (step 164). Otherwise, if the verification fails, the input application does not get TCO-verification (step 162).

Level B verification is the lower level of verification. To obtain this verification level, the level B verification module is operative to run the TCO verification process on a local machine or in a cloud simulation development environment (e.g., a "Development Fabric") deployed on-premise (step 152). This allows the cost-analysis process to run but the level of verification is less strict due to the simulated environment. If the input application code passes the criteria described above (step 156) then the application code is TCO-verified level B (step 160). Otherwise, if the verification fails, the input application does not get TCO-verification (step 162).

User Behavior Simulator

Considering an input application, it is common for different parts of the application to execute differently. As is typical, the execution of the application depends on user actions and behavior tendencies. More importantly, effectiveness of particular code blocks may vary at different execution times depending on one or more factors, such as loads, available resources, code robustness, etc. Identifying common user behavior patterns and simulating their effect on the input application is important for determining the real and actual impact of the code on the TCO of a software product.

Figure 13:
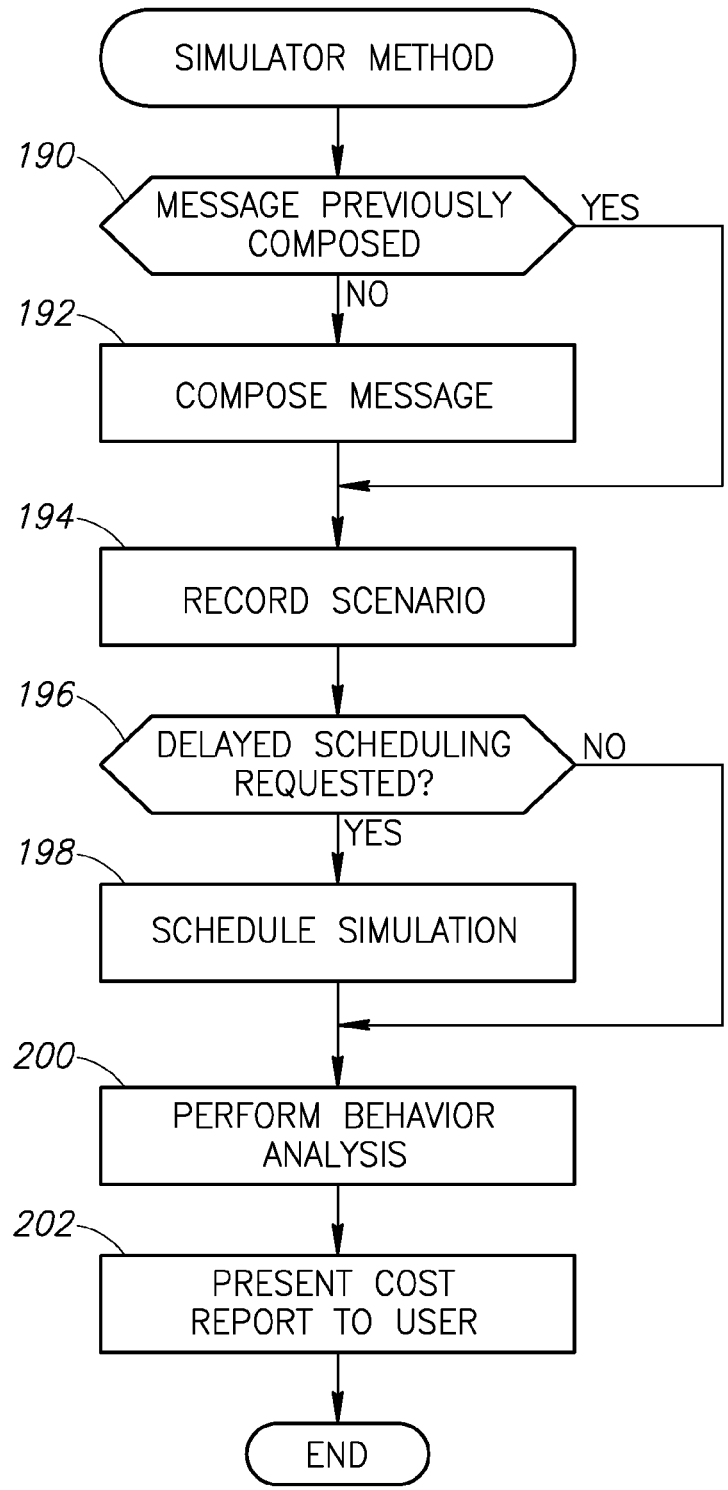
FIG. 13 is a flow diagram illustrating the simulator method of the present invention.

A flow diagram illustrating the simulator method of the present invention is shown in FIG. 13. If an application message has not been previously composed (step 190), then one or more applications are composed (step 192). The messages are used by the COP to trigger different scenarios within an input application. One or more scenarios to be applied to the input application are recorded (step 194). If delayed scheduling is requested by the user (step 196), than one or more simulations are then scheduled (step 198). Either through delayed scheduling or an immediate simulation command, behavior analysis on the input application is then performed (step 200) and a cost report is presented to the user (step 202).

Figure 14:
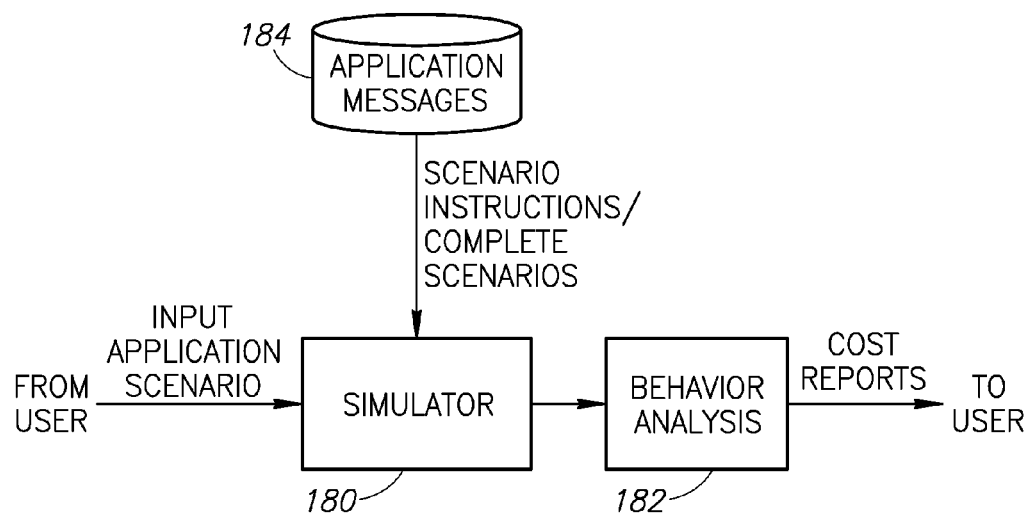
FIG. 14 is a block diagram illustrating the user behavior simulator.

A block diagram illustrating the user behavior simulator is shown in FIG. 14. The simulator 180 receives one or more input application scenarios from the user and retrieves scenario instructions and/or complete scenarios from an application message database 184. The simulation and all related parameters, scenarios, etc. is run via the behavior analysis block 182. The behavior analysis block generates the cost reports which are provided to the user.

In one embodiment, the simulations of an application are defined in one or more ways as follows. (1) Application Messages: whereby the simulator provides for defining or recording a set of application messages that trigger different scenarios within an application. For example, sending windows messages to a windows application or sending request messages to web sites or services. (2) Input Recording: whereby the simulator tracks and records user input in an input application. Input recording enables the simulator to compose scenarios that are specifically selected for recording, giving the ability to repeat the scenario at any time in the future. (3) Testing: whereby the simulator permits specific tests to be run, such as unit or integration tests. The testing capability provides the ability to write specific and customized tests for imitating certain behaviors of an input application.

Note that regardless of the approach used, the simulator comprises a scheduling interface where scenario cycles can be defined while controlling and/or configuring different settings such as the number of execution times, to be scheduled, either sequentially, in parallel or synchronized in a timely fashion. The input recording, application message and testing capability in combination with scheduling provides an effective way to describe numerous scenario patterns for identifying the implications of an application and one or more code changes on TCO.

Figure 15:
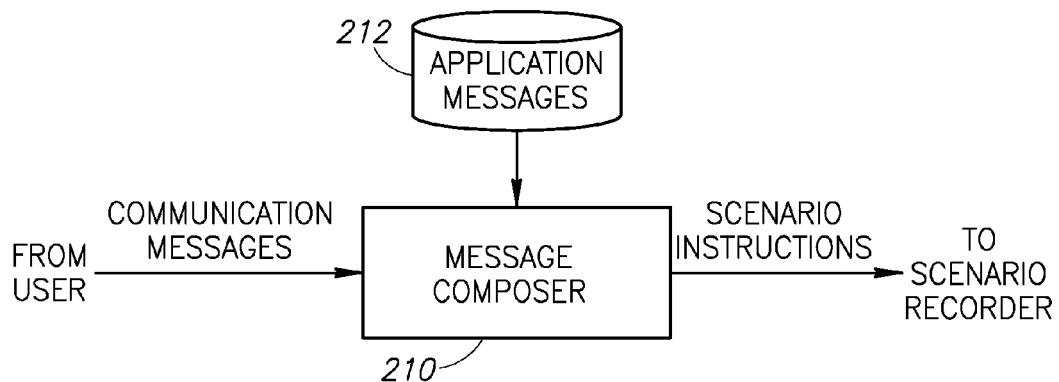
FIG. 15 is a block diagram illustrating the message composer portion of the simulator.

A block diagram illustrating the message composer portion of the simulator is shown in FIG. 15. One or more user supplied communication messages are input to the message composer 210. The message composer, accessing the application message database 212, is operative to generate one or more scenario instructions. The output scenario instructions are provided to the scenario recorder for recording.

Figure 16:
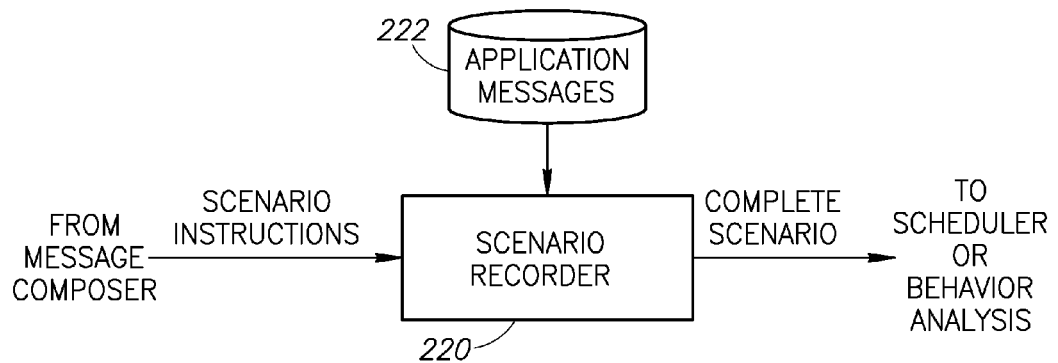
FIG. 16 is a block diagram illustrating the scenario recorder portion of the simulator.

A block diagram illustrating the scenario recorder portion of the simulator is shown FIG. 16. The scenario recorder 220 is operative to generate one or more complete scenarios based on one or more scenario instructions received from the message composer and access to the application messages database 222. The complete scenarios are input to either the scheduler or directly to the behavior analysis block for application simulation.

Figure 17:
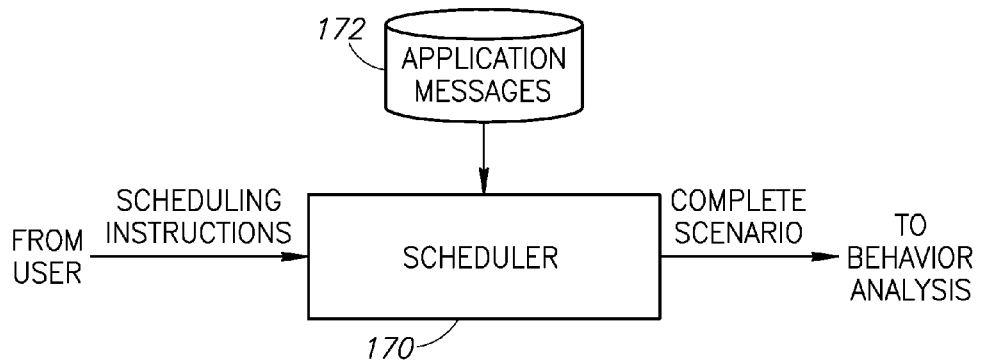
FIG. 17 is a block diagram illustrating the scheduler portion of the simulator.

A block diagram illustrating the scheduler portion of the simulator is shown in FIG. 17. One or more user supplied scheduling instructions are input to the scheduler 170, which accesses the application message database 172 to generate complete scenarios. The complete scenarios are input to the behavior analysis block processing.

Note that the simulator executes the scenarios in full synchronization with pricing models and profiles of the cloud platform, e.g., Azure, Google, Amazon, etc. Moreover, the simulator illustrates how specific code varies in different scenarios and its immediate effects on the TCO-level of an application. Using its analytic model, the simulator provides statistics reports, improvement suggestions, architecture recommendations and a best matching pricing model for the actual running of an application.

In one embodiment, the simulator supports various technologies, such as Windows Presentation Foundation (WPF), Silverlight, ASP.NET, Windows Communication Foundation (WCF) and Windows Forms. In addition, the simulator is operative to fully integrate with development tools such as Visual Studio 2010 and Eclipse.

Further, the simulator functions to operate in various application deployment environments (e.g., the local development machine, staging environment or in the cloud) thus providing simulation capabilities throughout the entire application lifecycle management. This is described in more detail infra.

Cost Oriented Profiler Guided Optimization

As described supra, the COP mechanism of the present invention aids in identifying costly functions in an input application. There may exist, however, a high cost function that gets called a few times during the lifetime of the application while a much cheaper line of code gets called many times and has a bigger effect on the overall TCO. To reduce the TCO of such an application, the cheaper line of code preferably should be optimized.

In order to obtain the information regarding the most used part of the application, a usage scenario is created for this purpose. In one embodiment, such a scenario derived from information provided by a developer regarding the number of calls to each of the application services. A problem with this approach is that the developer typically does not know the precise usage profile of the application. In addition, Web applications have other calling interfaces such as Forms postback which are difficult to predict.

In another embodiment, the necessary information is obtained by recording the behavior of the application in a simple run, e.g., a run of a unit test or a manual execution of the application. This approach, however, is not sufficient as it does not entirely capture the read world usage of the application by its actual users. The actual users invariably find new and unexpected ways the use a given application.

In another embodiment, statistics information collected from actual usage of the application is obtained when the application is deployed in the cloud. The COP collects information regarding the usage of each part of the application from several sources. One source is the cloud itself that provides the TCO of the application for each cost factor, such as computation, transaction, storage, networking, etc. The COP correlates each source code part to its cost factor and predicts the application usage scenario in proximity. Note that this is a statistical based user scenario. An additional source of application usage behavior is the application itself which is modified with code (i.e. instrumented) that collects the precise usage of the application. As a result, information is collected that represents real usage behavior and the input application can then be cost profiled accurately.

This technique, however, potentially suffers from several drawbacks. A first drawback is that the technique is only useful for applications that are already deployed and used. To overcome this, the COP uses a bank of usage scenarios is collected corresponding to many cloud deployed applications. The statistics model of the code and behavior of the current application is correlated with those in the bank and the information collected for is used as a guide to the current application.

A second drawback is that instrumentation of the application adds code and collects information which adds to the TCO of the application for the profiling period. To reduce the TCO of an instrumented application, the instrumented application is run for a relatively short time. A statistical return on investment (ROI) is also provided. By optimizing the application with the information that was collected over a period of time, the ROI is obtained in a relatively short time.

A third drawback is that collected information likely will not match when changes are made to the application, e.g., application code is optimized or the next version of the application is developed. To overcome this problem, the COP is operative to use user actions as a guideline for a test run. As long as the user interaction with the system does not change (which is typically case during the optimization phase of processing), the current run continues to be compared with the original run. The code comparison engine 69 (FIG. 3) is then able to pinpoint the cost change of each part that has changed in the code. Even if there is a bigger change to the code, the collected information can still be used as a statistic model of the application usage.

Cost Reporting

Figures 18, 19:
FIG. 18 is a block diagram illustrating the cost reporting and comparison block.
FIG. 19 is a diagram illustrating example cost report output analysis recommendations.

As described supra, the output of the cost oriented profiler mechanism is a cost report that provides the results of analysis and simulation to the user. A block diagram illustrating the cost reporting and comparison block is shown in FIG. 18. The cost reporting and comparison block 230 is operative to generate the one or more cost reports based on the analysis results received from the static and dynamic analysis engines 66, 67, 68, 69, 70, 71, 72 (FIG. 3).

A diagram illustrating example cost report output analysis recommendations is shown in FIG. 19. The upper half of the diagram presents a portion of example input application source code, while the lower half presents COP analysis recommendations to reduce the software TCO. Sections in the source code that are potentially problematic after a profiling session or static/dynamic code analysis) are highlighted.

Figure 20:
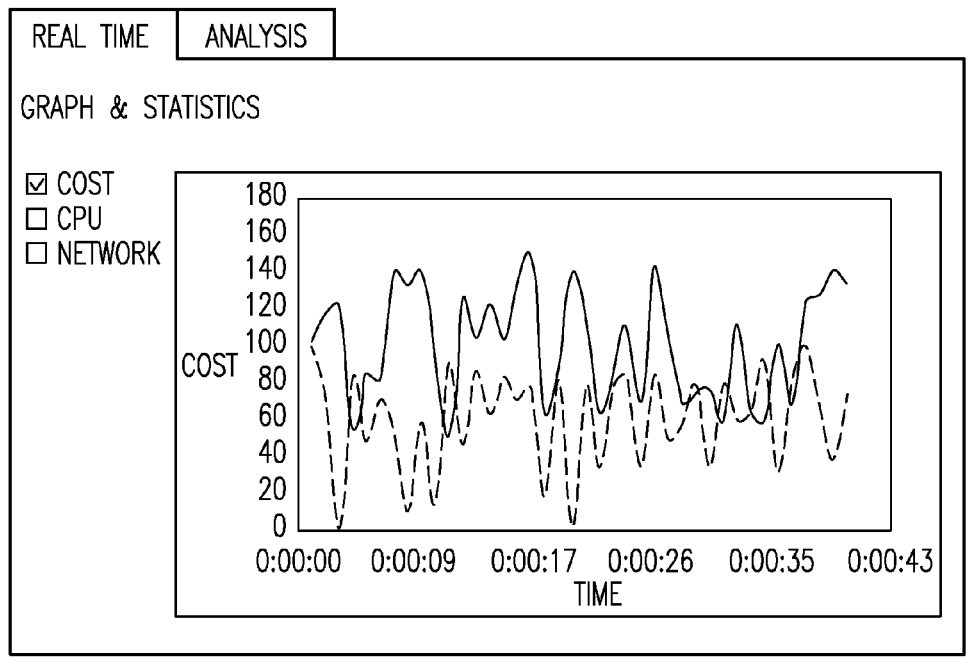
FIG. 20 is a diagram illustrating example application cost as a function of time.

A diagram illustrating example application cost as a function of time is shown in FIG. 20. In one embodiment, the cost report from the COP comprises a real-time monitor that presents the software project currently being profiled using charts focusing on metrics such as ownership costs, CPU and network utilization.

TCO Projector/Mapper

Figure 21:
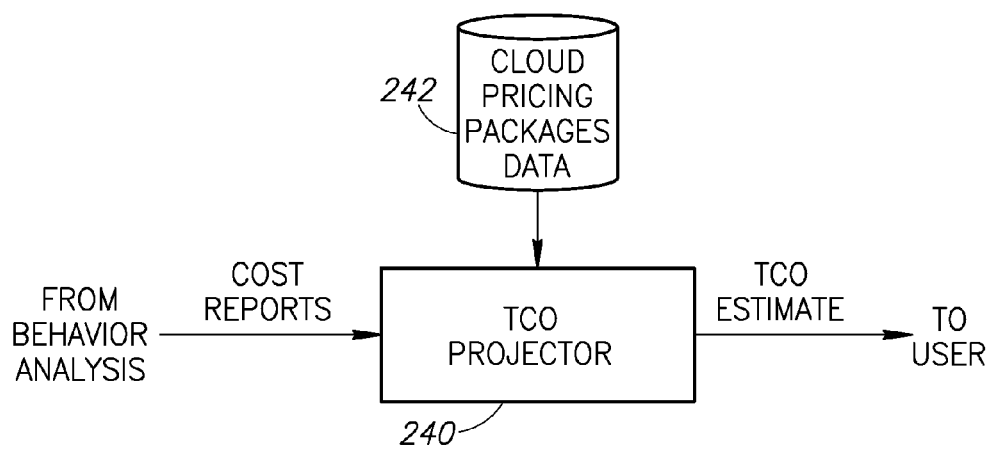
FIG. 21 is a block diagram illustrating the TCO projector block.
Figures 22, 23:
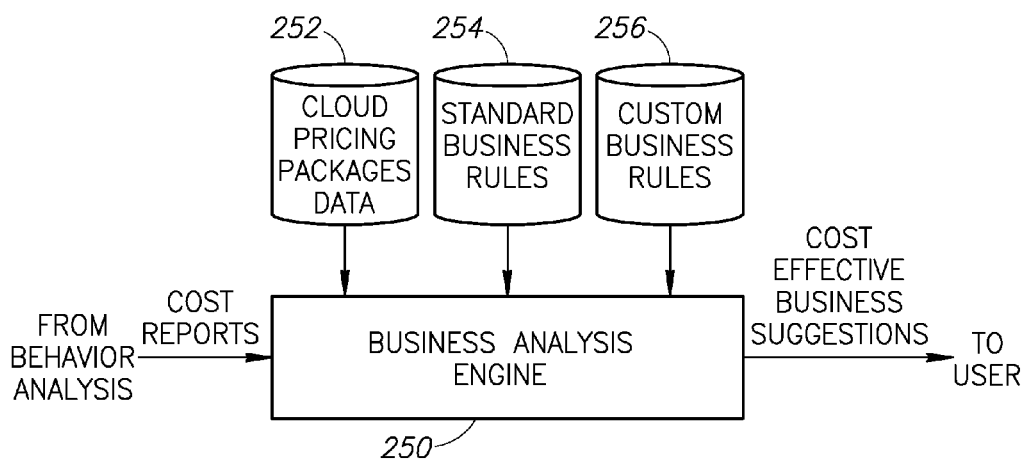
FIG. 22 is a diagram illustrating an example output display of the COP.
FIG. 23 is a block diagram illustrating the business analysis engine.

As described supra, one of the key functions of the cost oriented profiler mechanism is to provide an estimate of software TCO. A block diagram illustrating the TCO projector block is shown in FIG. 21. The TCO projector 240 is operative to generate a TCO estimate based on one or more cost reports from the behavior analysis block and cloud pricing package data 242. The COP is operative to generate output to the user that maps the projected TCO of a software project to different pricing packages or even different vendors, where applicable. An example output display is shown in FIG. 22.

For example, a certain cost estimate for a project on Windows Azure under large bulk pricing maps to a different cost under a different available pricing model. The COP is operative to map the projected cost to different vendors and packages and recommend the optimum vendor and pricing combination.

Business Analysis Engine

In one embodiment, an optional business analysis engine is operative to provide additional analysis and insight into cost and software TCO beyond what the cost report (described supra) provides. A block diagram illustrating the business analysis engine is shown in FIG. 23. The cost reports from the behavior analysis block 85 (FIG. 2) are fed into the business analysis engine 250. Based on the input cost reports and one or more business rules and related data, the business analysis engine functions to generate one or more cost effective business recommendations in the form of business analysis reports. The business rules, for example, include but are not limited to, cloud pricing package data 252, standard business rules 254 and custom business rules 256 which are defined by the user.

Note that a business request is usually initiated by either (1) user action, e.g., adding a product to a cart, or (2) a software action such as de-queuing a message from a queue. The business analysis engine 250 is operative to track the call tree starting from the root (i.e. the first line of code that handles the business request) down the stack to all subsequent calls. In one embodiment, this can be achieved using static or dynamic analysis methods described supra. In another embodiment, dynamic tracking is achieved by providing a cookie, i.e. an ID associated with the call, using mechanisms such as logical call context that relies on thread local storage. When the COP finds a line of code that make a costly action, this cost is added to the total cost associated with the business request corresponding to the cookie. The total cost of all subsequent calls associated with a business request is the cost of a single activation of the request. The output result is a business analysis report which provides business related cost information that can be used to make business related decisions, e.g., whether to remove cost functionality of the application, or to charge more money from the customer when they use costly operations. The business analysis report enables grouping of related business requests. For example, grouping all catalogue browsing requests provides the total cost of browsing the catalogue.

Sample contents of a sample business analysis report are presented below in Table 1.

| Group Name | Business Activity | Cost Per 1000 Calls | Group Total |
|---|---|---|---|
| Shopping | Add To Cart | 0.1 | |
| | Browse Products | 0.3 | |
| | Sort By Release Date | 0.01 | |
| | Sort By Name | 0.01 | |
| | Sort By Price | 0.02 | 0.44 |
| User Management | Create New Account | 1 | 1.7 |
| | Update User Profile | 0.5 | |
| | Add Shipment Address | 0.2 | |

In Table 1 above, the costs are provided for various business activities such as sorting products and adding a shipment address. For each business activity, the cost per 1000 calls is provided.

User Interface

Regarding the user interface of the cost oriented profiler (COP) mechanism, it is noted that the COP can be implemented as a standalone application and an integrated device environment (IDE) plug-in, e.g., a Visual Studio add-in and an Eclipse add-in. Integrating the tool into the IDE enables easier access for analyzing a projects' cost of ownership during development and provides linking and automation with source control systems.

Common features of such a tool include attaching to (1) local processes; (2) cloud emulation environments; and (3) Internet clouds. The user interface also comprises various views as described supra such as a real time monitor and analysis views. The user interface analysis views include (1) review and comparing of sessions; (2) filtering of data; and (3) recommendations and suggested fixes.

Figure 24:
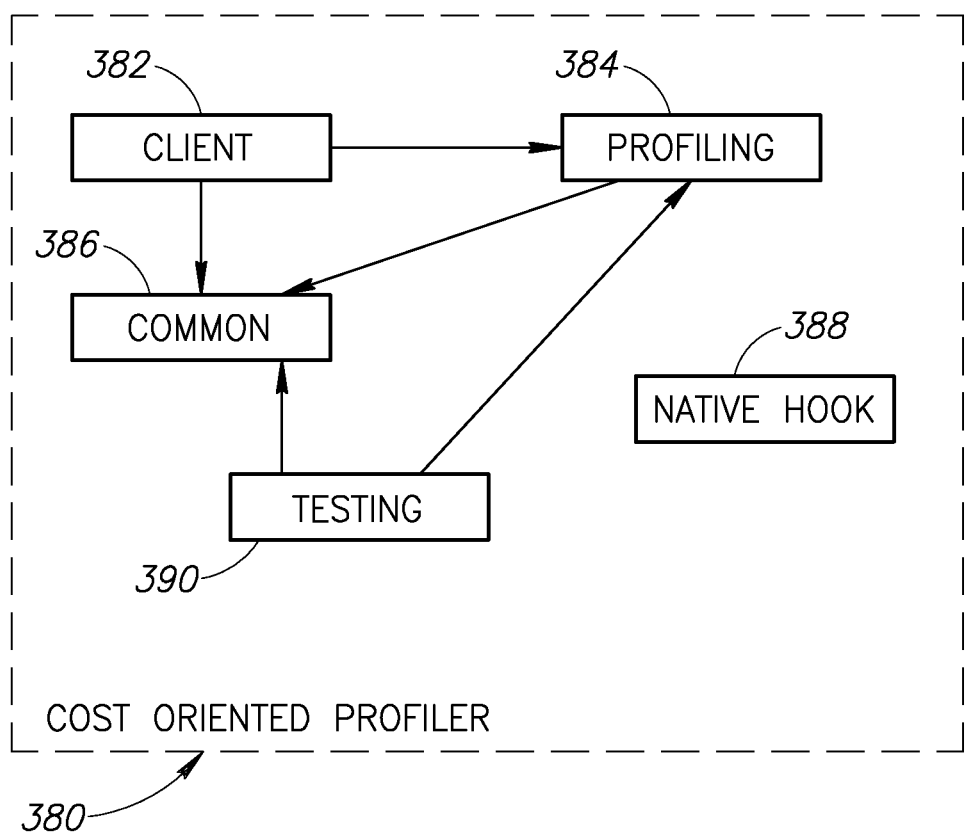
FIG. 24 is a high level block diagram illustrating an example implementation of the COP mechanism.

The IDE features include a cloud analysis project which includes (1) storing all profiling configuration information; (2) storing profiling history; (3) source control integration; (4) build server support which includes profiling using build server (i.e. automated tests), and failing a build according to customizable parameters; and code analysis rules. The IDE also features profile and debug support, menu integration including solution/project level context menus to directly start profiling the selected item, highlighting sections in the source code that are potentially problematic (after a profiling session or static code analysis), and visually showing code cost metrics Example COP Implementation A high level block diagram illustrating an example implementation of the COP mechanism is shown in FIG. 24. In an example embodiment, the COP, generally referenced 380, comprises five core components: a client component 382, profiling component 384, common component 386 native hook component 388 and testing component 390.

The common component 386 comprises a library for exposing a shared model and defining profile and cost information structures and infrastructure for decorating cloud services as visible to the profiler. The functions of the common component are to capture relevant profile events in structured data representation, complete with a stack trace. The profiler component 384 is operative to capture operation performance data published for profiling sessions (including stack trace and correlated log data), performing cost analysis calculations and storing the calculations in a data backend for persistence. The profiling process includes a cost calculation engine which calculates the cost of operation from one or more collected profiling events. It exposes various pricing models for different types of operations (i.e. cost profiles): (1) inbound traffic based on price per gigabyte; (2) transaction count based on price per transaction; and (3) storage size based on price per gigabyte. The cost calculation engine then determines the price breakdown for the price and adjusted price of accumulated operations in a call stack trace.

The testing component 390 comprises a test harness adapted to (1) run common cloud cost profiling scenarios, (2) retrieve the profiled results from the backend, and (3) evaluate cost effectiveness as a series of tests. The native hook component 388 is operative to detect flagged cloud packages in the development environment as profile targets and inject code hooks for capturing performance metrics and stack trace data. The client component 382 includes architecture that is modular whereby views are composed in visual regions of the shell window. In addition, the model view ViewModel (MVVM) architectural pattern has been employed whereby a View has a backing ViewModel that it binds to, thus providing clean and automatic separation of presentation and logic.

Example COP Application

The COP mechanism of the present invention is applicable to several different configurations and scenarios. Several example applications are described hereinbelow depicting the COP in various configurations. It is appreciated that the COP may be implemented in other applications and configurations and that the example presented herein are not intended to be limiting the scope or applicability of the invention.

Figure 25:
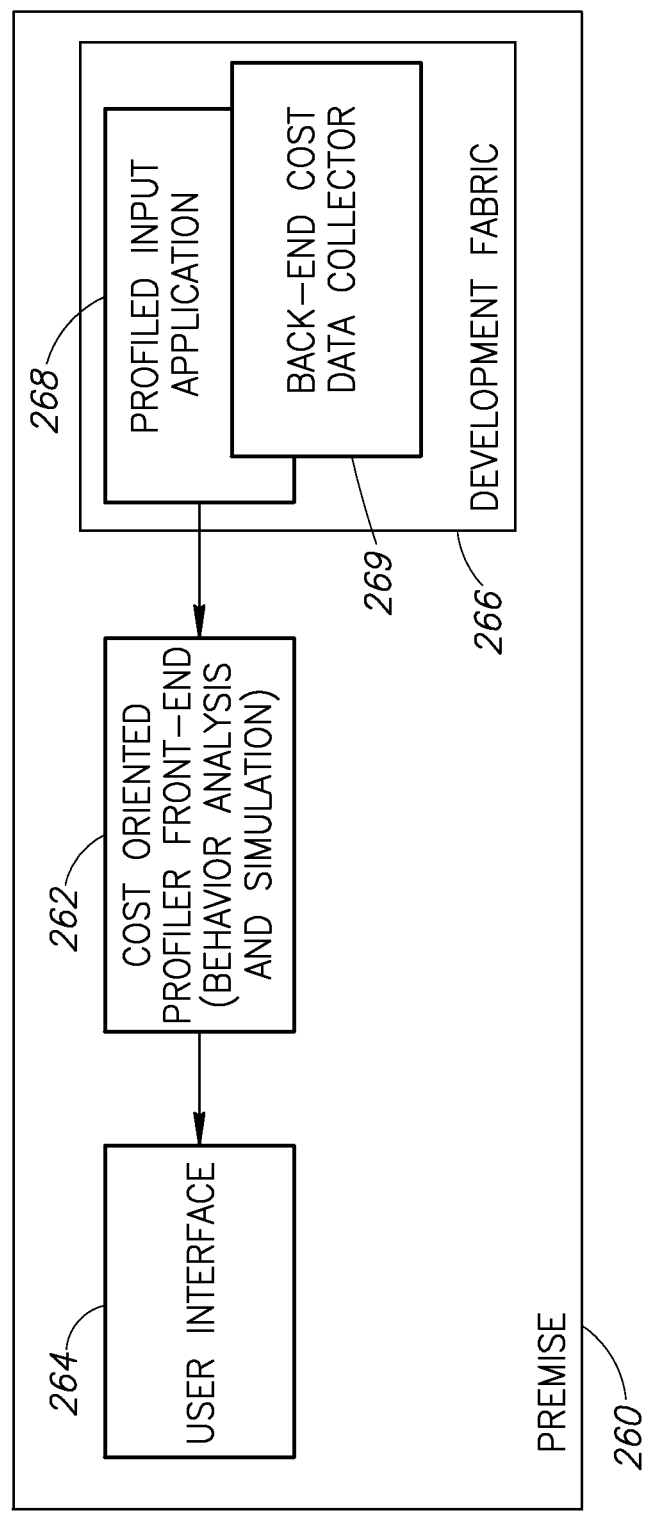
FIG. 25 is a diagram illustrating an example of on-premise application profiling.

A diagram illustrating an example of on-premise application profiling is shown in FIG. 25. In this example application, a COP front-end 262 is deployed on the premise (i.e. customer site) 260 and sits between the development fabric 266 and the user interface 264. The COP front-end is operative to hook itself into the running application. One way of placing hooks in the application is to instrument the application, as described supra. The COP front-end traces the application to find costly calls and to trace business requests. The development fabric comprises the input application to be profiled 268 and a COP back-end cost data collector 269. The COP back-end is operative to collect the tracing information for further analysis and to generate the various output reports. Note that in this example, the cloud does not participate.

Figure 26:
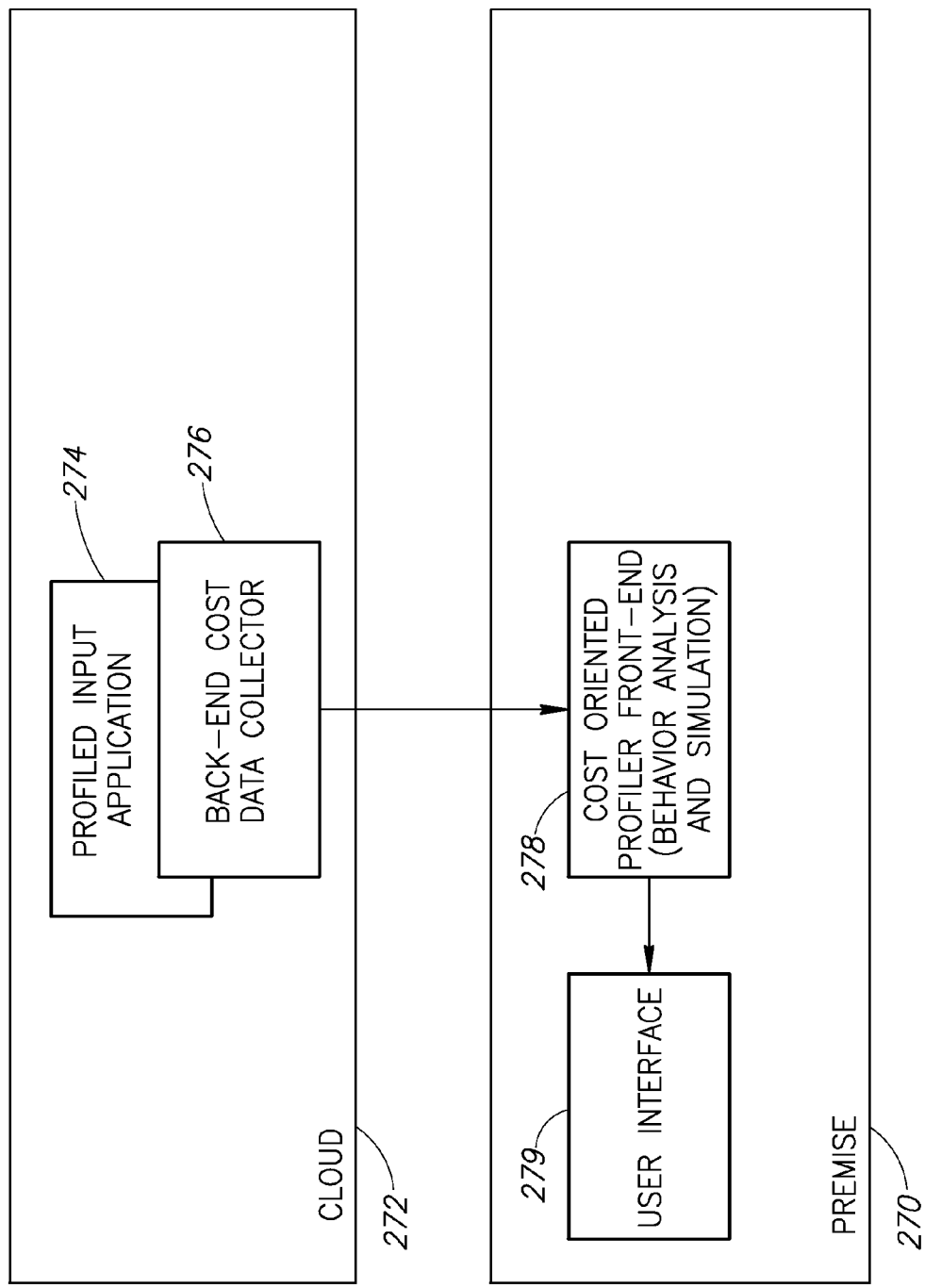
FIG. 26 is a diagram illustrating an example of application profiling in the cloud.

A diagram illustrating an example of application profiling in the cloud is shown in FIG. 26. In this example application, the COP front-end 278 is deployed on the premise (i.e. customer site) 270 and sits between the cloud 272 and the user interface 279. The cloud hosts the input application to be profiled 274 and the back-end cost data collector 276. Thus, in this example, input application profiling occurs in the cloud.

Figure 27:
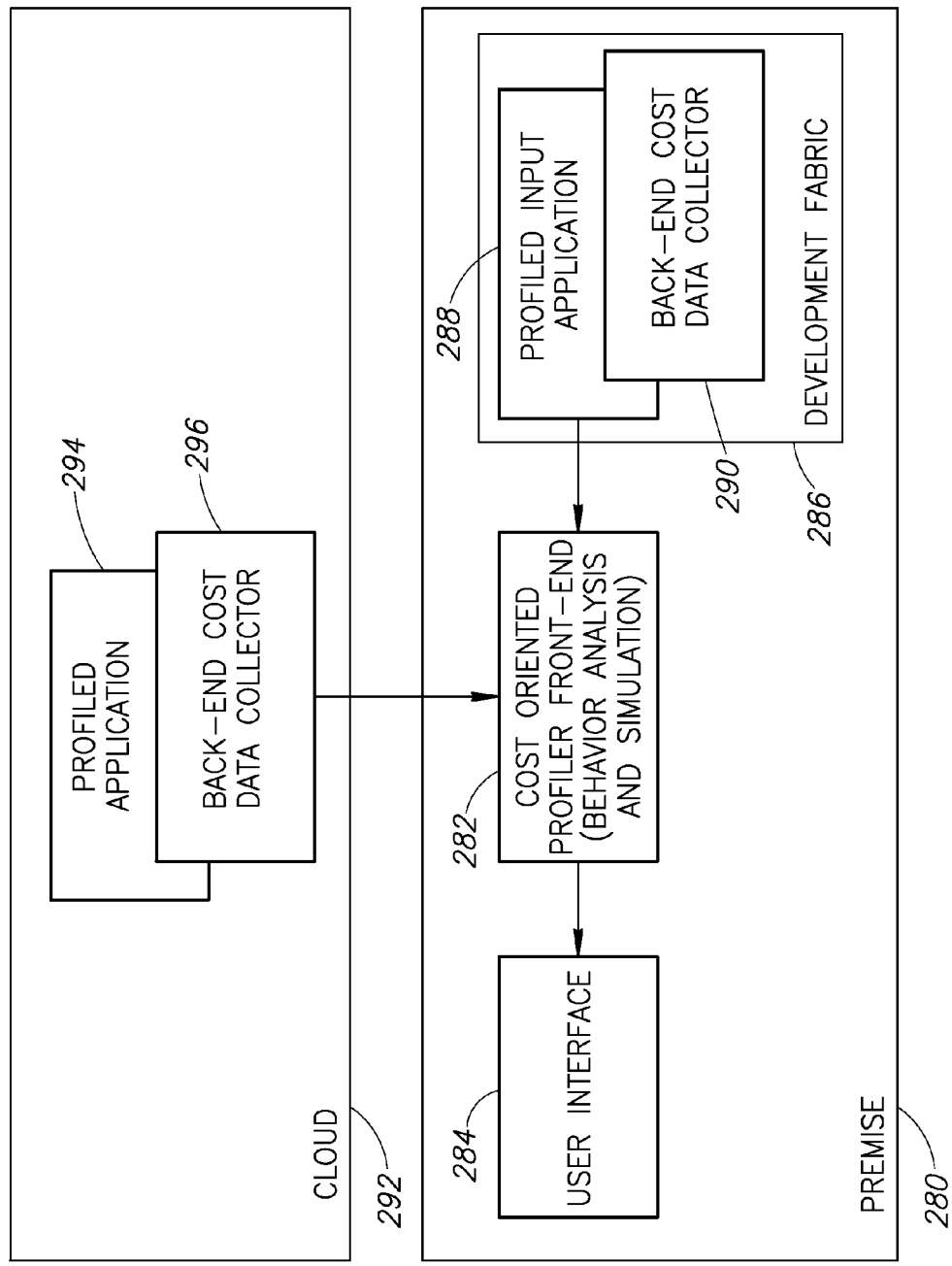
FIG. 27 is a diagram illustrating an example of hybrid application profiling.

A diagram illustrating an example of hybrid application profiling is shown in FIG. 27. In this example application, the COP front-end 282 is deployed on the premise (i.e. customer site) 280 and sits between the development fabric 286 and the user interface 284. The development fabric comprises the input application to be profiled 288 and the COP back-end cost data collector 290. The COP front-end also receives data collected by a second back-end data collector 296 that is located in the cloud and functions to collect cost data from the profiled application 294 running in the cloud. Note that in this example, a part of the profiled application runs on the premise and a part in the cloud. Thus, the cost data is collected in hybrid fashion by cost data collectors both in the cloud and the premise.

Figure 28:
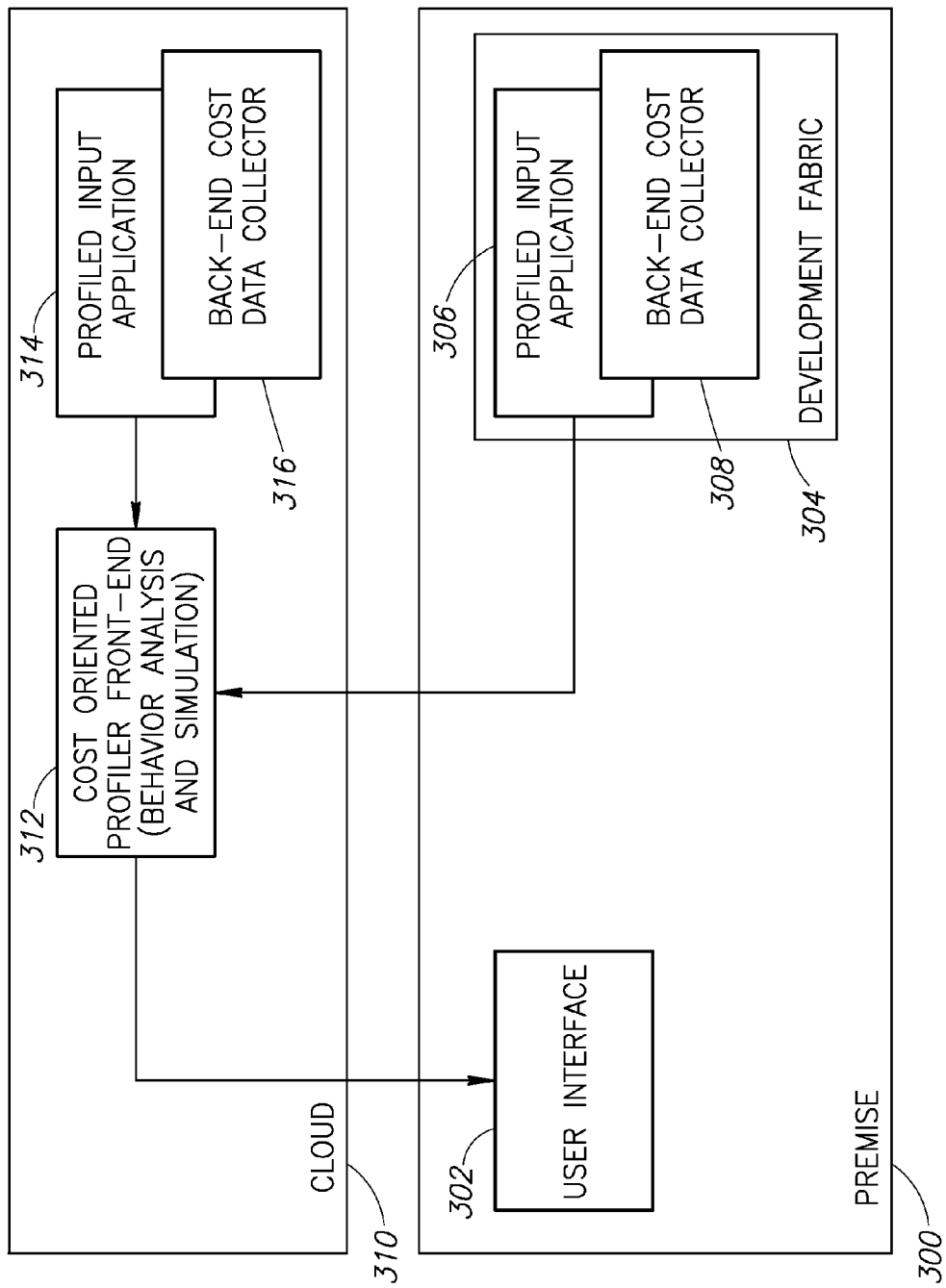
FIG. 28 is a diagram illustrating an example of cost oriented profiling as a service.

A diagram illustrating an example of cost oriented profiling as a service is shown in FIG. 28. In this example application, the COP front-end 312 is adapted to run in the cloud 310 as a service rather than on the premise 300. Cost data is collected from the profiled input application 314 by a first back-end data collector 316 and input to the COP front-end 312. The output of the front-end is coupled to the user interface 302 on the premise. A second back-end cost data collector 308 collects cost data from the profiled input application 306 in the development fabric 304.

Figure 29:
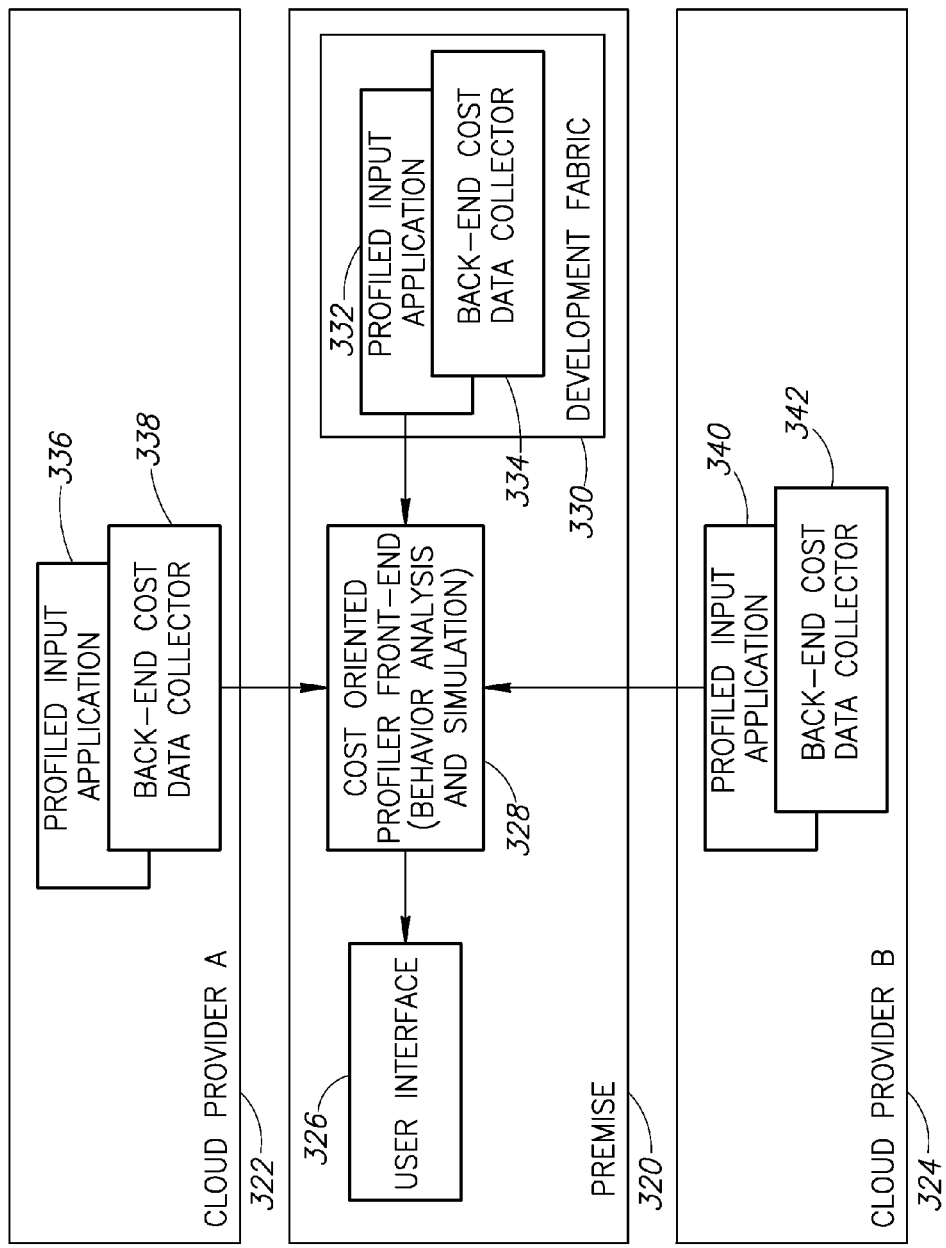
FIG. 29 is a diagram illustrating an example of cross-cloud COP deployment.

A diagram illustrating an example of cross-cloud COP deployment is shown in FIG. 29. In this example application, the COP is deployed in a cross-cloud configuration. The COP front-end 328 on the premise 320 is located between the user interface 326 and development fabric 330 which comprises a first COP back-end cost data collector 334 operative to collect cost data from profiled input application 332. The profiled input application 336 is run on a first cloud provider, cloud A 322. A second COP back-end cost data collector 338 is operative to collect cost data from profiled input application 336. The profiled input application 340 is run on a second cloud provider, cloud B 324. A third COP back-end cost data collector 342 is operative to collect cost data from profiled input application 340.

Figure 30:
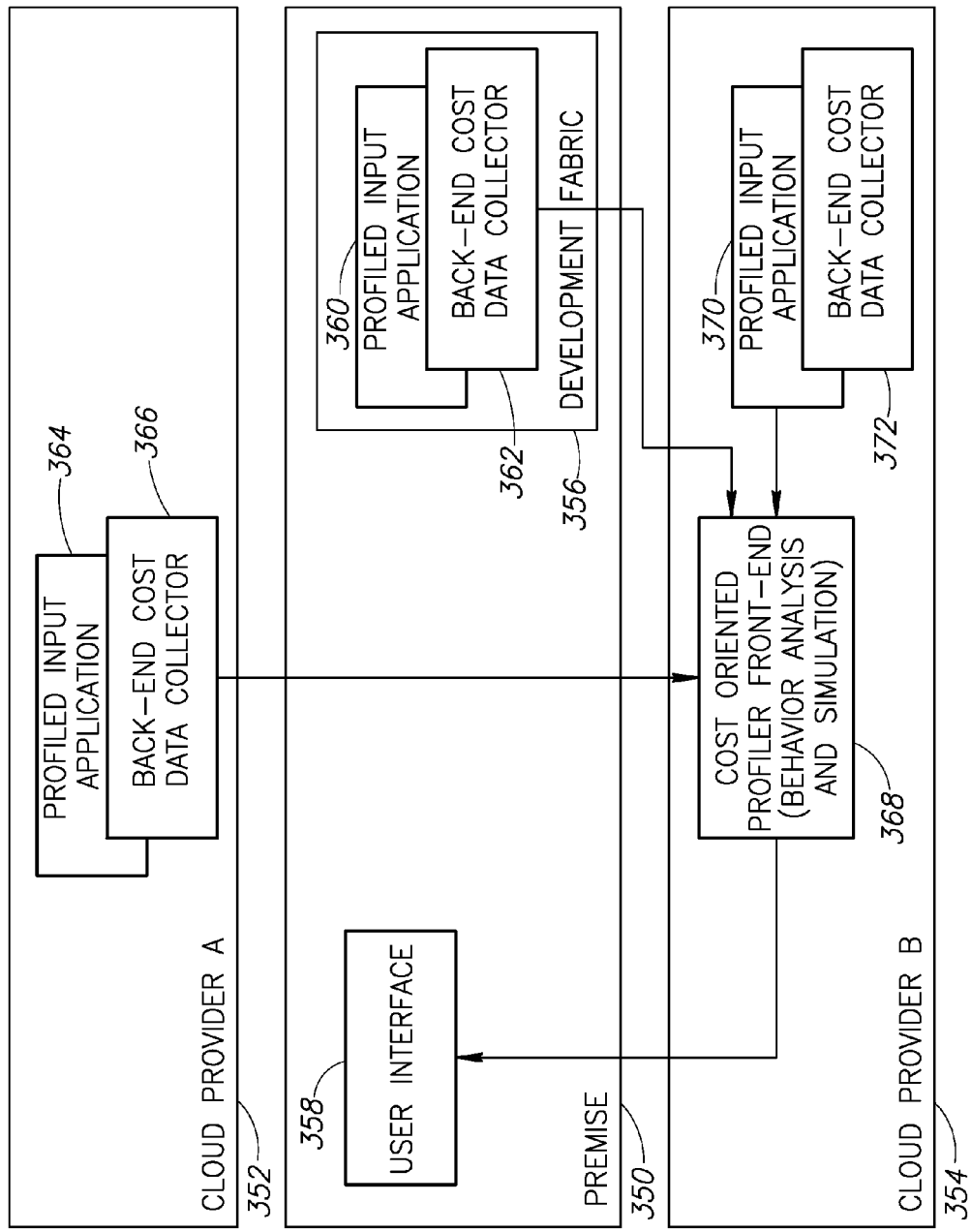
FIG. 30 is a diagram illustrating an example of cross-cloud COP deployment with the COP as a service.

A diagram illustrating an example of cross-cloud COP deployment with the COP as a service is shown in FIG. 30. In this example application, the COP front-end 368 is adapted to run in the cloud (e.g., cloud provider B 354) as a service rather than on the premise 350. Cost data is collected from the profiled input application 370 by a first back-end data collector 372 on cloud provider B and input to the COP front-end 368. The output of the front-end is coupled to the user interface 358 on the premise 350. A second back-end cost data collector 362 collects cost data from the profiled input application 360 in the development fabric 356. The profiled input application 364 is run on a second cloud provider, cloud A 352. A third COP back-end cost data collector 366 is operative to collect cost data from profiled input application 364.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method for use on a computer of cost oriented profiling of input software application code executing in a cloud computing environment to generate an economic cost estimate therefrom, said method comprising:

performing, on said computer, a static analysis of said input application code with regard to the total economic cost of ownership (TCO) using a static analysis engine and associated rules to find economically costly code therein with first indications as to the portions of said software application code that have the most impact on the TCO thereof;

performing, on said computer, a simulation of and dynamic analysis of said input application code with regard to the TCO using a dynamic analysis engine and associated rules to find economically costly code therein; and performing, on said computer, a dynamic analysis of said input application utilizing a dynamic analysis engine and associated rules to find economically costly code therein with second indications as to the portions of said software application code that have the most impact on the TCO thereof;

said dynamic analysis including simulating, on said computer, the usage of said input application code utilizing a cost oriented simulator to generate a dynamic analysis with third indications of any costly code found thereby providing a measure to a user of the total cost of ownership of said input application code; and generating, on said computer, one or more economic cost estimate reports based on the results of said behavior static analysis, simulation and dynamic analysis, wherein said economic cost estimate reports include those portions of the application code having the most impact on the TCO, said first and second indications and one or more recommendations for reducing the TCO.

2. The method according to claim 1, wherein analyzing the behavior of said input application code comprises determining one or more lines of code, blocks or functions of said input application code that can potentially be optimized for cost.

3. The method according to claim 1, wherein analyzing the behavior of said input application code comprises determining whether storage utilization costs can be optimized according to the usage of said input application code.

4. The method according to claim 1, further comprising simulating the usage of said input application code utilizing a cost oriented simulator, said simulator operative to generate a dynamic analysis indicating any costly code found thereby providing a measure to a user of the total cost of ownership of said input application code comparing multiple versions of said source code and determining if a particular change to said source code increases or decreases software TCO.

5. The method according to claim 4, wherein said cost oriented simulator comprises tracking and recording user input to said input application thereby enabling recorded scenarios to be repeated.

6. The method according to claim 4, wherein said cost oriented simulator comprises enabling said user to define and record a set of application messages that trigger different scenarios within said input application.

7. The method according to claim 4, wherein said cost oriented simulator comprises providing a scheduling interface wherein scenarios can be defined while controlling or configuring one or more settings.

8. The method according to claim 1, wherein analyzing the behavior of said input application code comprises analyzing said input application code for violations of cost related programming rules and conventions related to performance and service costs.

9. The method according to claim 1, wherein analyzing the behavior of said input application code comprises comparative profiling of a cloud storage service mechanism used by said input application code.

10. The method according to claim 9, wherein comparative profiling of said cloud storage service mechanism comprises finding specific storage access smells and comparing costs of a plurality of cloud storage options.

11. The method according to claim 9, wherein comparative profiling of said cloud storage service mechanism comprises aggregating one or more relevant monitored events for each instance of cloud application storage for subsequent reporting to a user.

12. The method according to claim 9, wherein comparative profiling of said cloud storage service mechanism comprises filtering event traces by a relevant subset of event data.

13. The method according to claim 9, wherein comparative profiling of said cloud storage service mechanism comprises replaying captured event data against a local instance of said cloud storage service thereby re-executing saved events as they occurred originally.

14. The method according to claim 9, wherein comparative profiling of said cloud storage service mechanism comprises monitoring an instance of a cloud database and identifying slow executing queries.

15. The method according to claim 9, wherein comparative profiling of said cloud storage service mechanism comprises analyzing Structured Query Language (SQL) statements and stored procedures in a development fabric and determining cost optimization in accordance therewith.

16. The method according to claim 9, wherein comparative profiling of said cloud storage service mechanism comprises auditing activity on a cloud database instance and providing a cost analysis breakdown of live usage over a sampling period.

17. The method according to claim 9, wherein comparative profiling of said cloud storage service mechanism comprises utilizing one or more predefined trace templates to support a generic trace for recording cloud database events and activities that affect the cost of operations.

18. The method according to claim 9, wherein comparative profiling of said cloud storage service mechanism comprises utilizing one or more custom profiling trace templates for recording cloud database events and activities which affect the cost of operations.

19. The method according to claim 1, wherein analyzing the behavior of said input application code comprises determining one or more code optimizations that yield cost reductions.

20. The method of cost oriented profiling according to claim 19, wherein determining one or more code optimizations comprises utilizing a cost saving optimization algorithm adapted to one or more cloud application business cases.

21. The method of cost oriented profiling according to claim 19, wherein determining one or more code optimizations comprises:
utilizing pricing rules that identify and assess performance factors affecting one or more cloud billing decisions; and
recommending a course of action by applying a maximum expected utility action axiom to said one or more cloud billing decisions.

22. The method of cost oriented profiling according to claim 19, wherein determining one or more code optimizations comprises:
utilizing a decision tree representing one or more available price package alternatives; and
evaluating probability distributions for said one or more available price package alternatives.

23. The method of cost oriented profiling according to claim 19, wherein determining one or more code optimizations comprises:
estimating a compute hours metric; and
generating one or more code optimization recommendations that minimize said compute hours metric.

24. The method of cost oriented profiling according to claim 19, wherein determining one or more code optimizations comprises applying one or more accounting techniques to provide amortized cost information about one or more cloud operations.

25. The method of cost oriented profiling according to claim 19, wherein determining one or more code optimizations comprises applying time series predictions of past performance and previous demand to estimate an amount to be spent on cloud service resources over a given time period.

26. The method according to claim 1, wherein analyzing the behavior of said input application code comprises applying one or more analytical methods to determine a plurality of optimal code decisions that minimize the cost of deploying said input application to said cloud.

27. The method according to claim 26, wherein applying one or more analytical methods comprises evaluating one or more price/performance tradeoffs between different storage/computation alternatives.

28. The method according to claim 26, wherein applying one or more analytical methods comprises utilizing a routing service to dynamically determine an application instance to utilize in a distributed cloud application.

29. The method according to claim 26, wherein applying one or more analytical methods comprises scheduling cloud operations to optimize use of queues and to balance service access requests so as to minimize operational costs.

30. The method according to claim 26, wherein applying one or more analytical methods comprises load balancing an algorithm instance between different cloud computing host applications.

31. The method according to claim 26, wherein applying one or more analytical methods comprises moving services from local servers exhibiting high usage to idle cloud services.

32. The method according to claim 26, wherein applying one or more analytical methods comprises performing capacity provision analysis to determine the amount of storage used by an algorithm thereby enabling provisioning at an optimum cost/capacity point.

33. The method according to claim 1, wherein analyzing the behavior of said input application code comprises approximating the cost of said input application under different loads.

34. The method of cost oriented profiling according to claim 33, wherein approximating the cost of said application under different loads comprises estimating the complexity of an operation asymptotically to determine a number of compute steps per billable hour.

35. The method of cost oriented profiling according to claim 33, wherein approximating the cost of said application under different loads comprises estimating the computational complexity of an algorithm.

36. The method of cost oriented profiling according to claim 33, wherein approximating the cost of said application under different loads comprises measuring the complexity of an algorithm to provide a performance analysis under relatively small random perturbations of worst case inputs.

37. The method of cost oriented profiling according to claim 33, wherein approximating the cost of said application under different loads comprises reducing computationally expensive combinatorial calculations by applying a pruning algorithm and one or more cutoff thresholds.

38. The method of cost oriented profiling according to claim 33, wherein approximating the cost of said application under different loads comprises determining the average running time per algorithmic operation over a worst case sequence of operations.

39. The method of cost oriented profiling according to claim 33, wherein approximating the cost of said application under different loads comprises analyzing online algorithms exposed in said cloud whereby the performance of a service is compared to the performance of an optimal offline algorithm that processes the same sequence of requests.

40. The method of cost oriented profiling according to claim 33, wherein approximating the cost of said application under different loads comprises inspecting an algorithm and recommending one or more general optimization heuristics that reduce costs.

41. The method of cost oriented profiling according to claim 33, wherein approximating the cost of said application under different loads comprises identifying the processes in an algorithm which affect the overall duration of a cloud operation.

42. The method of cost oriented profiling according to claim 33, wherein approximating the cost of said application under different loads comprises analyzing properties of an algorithm to determine the level of resources it consumes and the operational cost associated therewith.

43. The method according to claim 1, wherein analyzing the behavior of said input application code comprises tracking changes in said application code and comparing cost oriented profiler results before and after said changes.

44. The method according to claim 1, wherein analyzing the behavior of said input application code comprises determining whether said application code passes or fails one or more total cost of ownership (TCO) verification tests.

45. The method according to claim 1, wherein said one or more cost reports comprises mapping projected total cost of ownership (TCO) of said input application to one or more cloud pricing packages.

46. The method according to claim 1, wherein analyzing the behavior of said input application code comprises providing guidance and recommendations based on said one or more cost reports thereby enabling a user to reduce costs and improve efficiency.

47. The method according to claim 46, wherein providing guidance and recommendations comprises utilizing one or more business rules that match the business demands of said input application.

48. A method for use on a computer of cost oriented profiling of input software application code executing in a cloud computing environment to generate an economic cost estimate therefrom, said method comprising:
performing, on said computer, a static analysis of said input application code with regard to the total economic cost of ownership (TCO) using a static analysis engine and associated rules to find economically costly code therein;
performing, on said computer, a simulation of and dynamic analysis of said input application code with regard to the TCO using a dynamic analysis engine and associated rules to find economically costly code therein;
determining one or more lines of code, blocks or functions that can potentially be optimized for cost;
determining whether economic costs associated with storage utilization costs can be optimized according to usage of said application code; and
simulating the usage of said input application code using a cost oriented simulator to generate a dynamic analysis indicating any costly code found thereby providing a measure of the total cost of ownership of said application code.

49. An apparatus for economic cost oriented profiling of input software application code executing in a cloud computing environment and generating an economic cost estimate therefrom, comprising:
one or more economic cost oriented static analysis engines;
one or more economic cost oriented dynamic analysis engines;
a static rules database;
a dynamic rules database;
a behavior analysis module operative to perform a static analysis of said input application code with regard to the total economic cost of ownership (TCO) using said one or more static analysis engines and associated static rules database to find economically costly code therein;
said behavior analysis module operative to perform a dynamic analysis of said input application code with regard to the TOC using said one or more dynamic analysis engines and associated dynamic rules database to find economically costly code therein; and
a cost oriented simulator coupled to said behavior analysis module and operative to simulate the usage of said input application code to generate dynamic analysis results indicating costly code found by said behavior analysis module thereby providing a measure of the economic TCO of said input application code.

50. The apparatus according to claim 49, wherein said behavior analysis module is operative to determine one or more lines of code, blocks or functions that can potentially be optimized for cost.

51. The apparatus according to claim 49, wherein said behavior analysis module is operative to determine whether storage utilization costs can be optimized according to usage of said input application code.

52. The apparatus according to claim 49, wherein said behavior analysis module comprises a code inspection rule engine operative to analyze said input application code for violations of cost related programming rules and conventions related to performance and service costs.

53. The apparatus according to claim 49, wherein said behavior analysis module comprises a storage utilization profiler engine operative to comparatively profile a cloud storage service mechanism used by said input application code.

54. The apparatus according to claim 49, wherein said behavior analysis module comprises a cost decision analysis engine operative to determine one or more code optimizations that yield cost reductions.

55. The apparatus according to claim 49, wherein said behavior analysis module comprises an operation analysis engine operative to apply one or more analytical methods to determine a plurality of optimal code decisions that minimize the cost of deploying said input application to said cloud.

56. The apparatus according to claim 49, wherein said behavior analysis module comprises an algorithm analysis engine operative to approximate the cost of said input application under different loads.

57. The apparatus according to claim 49, wherein said behavior analysis module comprises a code comparison engine operative to track changes in said application code and compare cost oriented profiler results before and after said changes.

58. The apparatus according to claim 49, wherein said behavior analysis module comprises a total cost of ownership (TCO) verifier operative to determine whether said input application passes or fails one or more TCO verification tests.

59. A computer program product for cost oriented profiling of input software application code executing in a cloud computing environment to generate an economic cost estimate therefrom, the computer program product comprising:

a tangible, non-transitory computer usable medium having computer usable code embodied therewith, the computer usable program code comprising:

computer usable code configured for performing a static analysis of said input application code with regard to the total economic cost of ownership (TCO) using a static analysis engine and associated rules to find economically costly code therein;

computer usable code configured for performing a simulation of and dynamic analysis of said input application code with regard to the TCO using a dynamic analysis engine and associated rules to find economically costly code therein; and computer usable code configured for performing a dynamic analysis of said input application utilizing a dynamic analysis engine and associated rules to find economically costly code therein with second indications as to the portions of said software application code that have the most impact on the TCO thereof;

computer usable code configured for performing said dynamic analysis by simulating the usage of said input application code utilizing a cost oriented simulator to generate a dynamic analysis with third indications of any costly code found thereby providing a measure to a user of the total cost of ownership of said input application code; and computer usable code configured for generating one or more economic cost estimate reports based on the results of said behavior static analysis, simulation and dynamic analysis, wherein said economic cost reports include those portions of the application code having the most impact on the TCO, said first and second indications and one or more recommendations for reducing the TCO.

60. The computer program product according to claim 59, further comprising computer usable code configured for determining one or more lines of code, blocks or functions of said input application code that can potentially be optimized for cost.

61. The computer program product according to claim 59, further comprising computer usable code configured for determining whether storage utilization costs can be optimized according to the usage of said input application code.

62. The computer program product according to claim 59, further comprising computer usable code configured for simulating the usage of said input application code utilizing a cost oriented simulator, said cost oriented simulator operative to generate a dynamic analysis indicating any costly code found thereby providing a measure of the total cost of ownership of said input application code comparing multiple versions of said source code and determining if a particular change to said source code increases or decreases software TCO.

* * * * *